United States Patent
Arksey et al.

(10) Patent No.: US 9,582,908 B2
(45) Date of Patent: Feb. 28, 2017

(54) METHOD AND SYSTEM FOR INTERACTIVE VISUALIZATION OF HIERARCHICAL TIME SERIES DATA

(75) Inventors: Nicole Danielle Arksey, Vancouver (CA); Angus Richard Telfer, Vancouver (CA); Michael Anthony Blackstock, Coquitlam (CA)

(73) Assignee: INETCO SYSTEMS LIMITED, Burnaby (CA)

( * ) Notice: Subject to any disclaimer, the term of this patent is extended or adjusted under 35 U.S.C. 154(b) by 318 days.

(21) Appl. No.: 12/912,564

(22) Filed: Oct. 26, 2010

(65) Prior Publication Data
US 2012/0102396 A1    Apr. 26, 2012

(51) Int. Cl.
*G06F 17/00*    (2006.01)
*G06T 11/20*    (2006.01)
*G06F 17/21*    (2006.01)

(52) U.S. Cl.
CPC .......... *G06T 11/206* (2013.01); *G06F 17/212* (2013.01)

(58) Field of Classification Search
CPC ..... G06T 11/206; G06F 17/211; G06F 17/212
USPC ......................................................... 715/273
See application file for complete search history.

(56) References Cited

U.S. PATENT DOCUMENTS

| | | | | |
|---|---|---|---|---|
| 6,111,578 A * | 8/2000 | Tesler | ................... | G06T 11/206 345/419 |
| 6,400,366 B1 * | 6/2002 | Davies | ................... | G06T 11/206 345/440 |
| 6,480,194 B1 * | 11/2002 | Sang'udi | ............... | G06F 3/0481 345/440 |
| 6,854,091 B1 * | 2/2005 | Beaudoin | ...................... | 715/854 |
| 7,424,530 B2 * | 9/2008 | Chagoly | ............. | G06F 11/3466 705/7.38 |
| 7,756,840 B2 | 7/2010 | Warshawsky | | |
| 7,797,637 B2 * | 9/2010 | Marcjan | ................ | G06F 3/0486 715/759 |
| 2004/0019641 A1 * | 1/2004 | Bartram | ................ | H04L 67/104 709/205 |
| 2004/0051721 A1 * | 3/2004 | Ramseth | ............. | G06F 19/3406 345/689 |

(Continued)

FOREIGN PATENT DOCUMENTS

EP          1 077 420 A2     2/2001
WO    WO 2010/075272 A2    7/2010

OTHER PUBLICATIONS

European Patent Office, Extended European Search Report for corresponding European Patent Application No. 11835374.7, mailed Jun. 30, 2014.

(Continued)

*Primary Examiner* — Laurie Ries
(74) *Attorney, Agent, or Firm* — Conneely PC; Joseph Conneely

(57) ABSTRACT

A method for presenting detailed information for an item within overview information on a display screen, comprising: displaying a first presentation of the overview information on the display screen, the overview information being presented on one or more lines of a grid; receiving a signal selecting the item from the first presentation; generating a second presentation by displacing the overview information at least partially away from a region in the first presentation and inserting the detailed information for the item into the region, wherein the overview information remains at least partially visible in the second presentation to provide context for the detailed information in the region, wherein the displacing displaces the one or more lines of the grid away from the region without distorting the lines, and wherein the inserting inserts one or more additional lines into the grid in the region upon which the detailed information is presented; and, displaying the second presentation on the display screen.

24 Claims, 23 Drawing Sheets

(56) References Cited

U.S. PATENT DOCUMENTS

| | | | |
|---|---|---|---|
| 2006/0112070 A1 | 5/2006 | Ramos | |
| 2007/0250787 A1* | 10/2007 | Kawahara et al. | ............ 715/782 |
| 2008/0112070 A1* | 5/2008 | Tanibata | .............. G02B 26/008 |
| | | | 359/891 |
| 2008/0192069 A1* | 8/2008 | Wanzke | .................. G06F 17/18 |
| | | | 345/619 |
| 2008/0295007 A1 | 11/2008 | Bernhardt | |
| 2009/0013281 A1* | 1/2009 | Helfman | ........... G06F 17/30572 |
| | | | 715/788 |
| 2009/0292677 A1* | 11/2009 | Kim | ..................... G06F 17/3089 |
| 2010/0064235 A1* | 3/2010 | Walls | ................. G05B 23/0267 |
| | | | 715/763 |
| 2010/0131883 A1* | 5/2010 | Linthicum | .......... G06F 19/3406 |
| | | | 715/771 |
| 2010/0146106 A1* | 6/2010 | Bartram | ................ H04L 67/104 |
| | | | 709/224 |
| 2010/0231595 A1* | 9/2010 | Dang | ................ G06F 17/30554 |
| | | | 345/440 |
| 2011/0166875 A1* | 7/2011 | Hayter et al. | ...................... 705/2 |
| 2011/0179370 A1* | 7/2011 | Cardno et al. | ................ 715/771 |
| 2011/0242108 A1* | 10/2011 | Mital et al. | ................ 345/440.2 |

OTHER PUBLICATIONS

Arksey, N., "Psyc 579 Class Project: Analysis of Hierarchical Clustering Explorer", Apr. 2006, Accessed From http://www.cs.ubc.ca/~narksey/docs/perception.pdf.

International Search Report for International Patent Application No. PCT/CA2011/001074, mailed Jan. 26, 2012.

Written Opinion for International Patent Application No. PCT/CA2011/001074, mailed Jan. 26, 2012.

Bartram, L., "Perceptual and Interpretative Properties of Motion for Information Visualization", Simon Fraser University, Technical Report CMPT-TR-1997-15, 1997.

McLachlan, P., et al., "LiveRAC: Interactive Visual Exploration of System Management Time-Series Data", CHI 2008, Apr. 5-10, 2008, Florence, Italy.

Heer, J., et al., "Animated Transitions in Statistical Data Graphics", In IEEE Transactions on Visualizations and Computer Graphics, 13(6), 1240-1247, 2007.

Kwan, E., et al., "Tableplot: A New Tool for Assessing Precise Predications", Journal of Psychology, 217(1), 38-48, 2009.

Flare, "Data Visualization for the Web", Retrieved Jun. 2010 from http://flare.prefuse.org/.

Grapher, "Grapher Version 7", Retrieved Jun. 2010 from http://www.geoafrica.co.za/reddog/gsw/grapher_graphtypes.htm.

Logrhythm, "LogRhythm Console", Retrieved Jun. 2010 from http://logrhythm.com/Portals/0/screenshots/LogRhythmPersonalDashboard40.jpg.

Anychart, "Chart Gallery—Anychart Flash Chart Component", Retrieved Jun. 2010 from http://www.anychart.com/products/anychart/gallery/Marker-and-Bubble-Charts.php.

Google, "Gadgets: Motion Chart", Retrieved Jun. 2010 from http://docs.google.com/support/bin/answer.py?answer=91610.

Hoare Research Software Ltd., "Grapher", Retrieved Jun. 2010 from http://www.hrs.co.nz/%28av5xxmi4hgom0k551nxtjlb4%29/prod_overview.aspx?ProductID=162.

\* cited by examiner

10

30

40

70

METHOD AND SYSTEM FOR INTERACTIVE VISUALIZATION OF HIERARCHICAL TIME SERIES DATA

FIELD OF THE INVENTION

This invention relates to the field of data visualization, and more specifically, to a method and system for interactive visualization of hierarchical time series data.

BACKGROUND OF THE INVENTION

Systems involving large amounts of complex data, such as transaction networks and multipurpose sensor systems, are difficult to monitor effectively for some of the following reasons. First, these systems involve large numbers of different types of indicators. Second, the applicable indicators result from examination of the data being monitored. For example, in a transaction network involving many types of transactions, measuring the "average transaction dollar value" may only be applicable for financial transactions. Third, groups of indicators being monitored have different value ranges indicating whether their operation is "normal", "good", "bad", etc. Fourth, groups of indicators being monitored have different "thresholds" indicating whether an external action is required.

As such, providing an interface that allows users to view diverse data that is changing in real-time is a challenging problem, especially when it is important that the user be able to quickly identify and react to an adverse change. In the case of many large distributed systems like computer networks, the problem is compounded by the fact that, upon seeing a change, the user must be able to quickly identify the source of the change.

In the following, several prior art methods and systems are briefly reviewed.

FIG. 1 is a screen capture illustrating an exemplary dashboard presentation 10 with widgets and logs in accordance with the prior art. Common practice in user interfaces for systems management is to provide a series of dashboards of various indicators such as duration, throughput or rate, and delay. These dashboards generally consist of widgets such as bar graphs, line graphs, pie charts, and logs in a layout configured by the application designer, system administrator, or end user. However, there are several problems with this approach. First, they may be very difficult to interpret at a glance. Second, drilling down to get more detailed information results in a switching of dashboards which makes it difficult to maintain context. Third, it is of limited use in complex monitoring situations as simply adding more dashboards to the screen is not feasible as each widget complicates the entire screen and there is a limited amount of screen space. Fourth, dashboards must be carefully constructed to ensure that users are provided with the information required for their specific purpose. This construction is problematic as it is difficult for the end user to know beforehand what visual information will be needed for problem identification and creating a new dashboard to get to the information needed is generally difficult or time consuming.

FIG. 2 is a screen capture illustrating an exemplary tableplot presentation 20 in accordance with the prior art. One way of examining a large amount of data on a single screen is a "tableplot". A tableplot is a display that supplements each cell of a table with a symbol proportionate to the cell value. For example, black circles may be used for positive values and red diamonds may be used for negative values. In addition, each cell in the table may contain a circle or diamond where the size is proportionate to the cell value. However, while a cell may show two different values using concentric rings, it may not be updated over time. In addition, such tableplots are not interactive for drill down or for pulling up related statistics.

FIG. 3 is a screen capture illustrating an exemplary categorized bubble chart presentation 30 with two categories in accordance with the prior art. And, FIG. 4 is a screen capture illustrating an exemplary categorized bubble chart presentation 40 with one category and one free axis (vertical) in accordance with the prior art. Another way of examining a large amount of data on a single screen is the categorized bubble chart. As in the tableplot, data points in such a bubble chart are categorized, or appear in any location along a free axis. However, these bubble charts are not interactive nor do they allow for drill down to subcategories.

FIG. 5 is a screen capture illustrating an exemplary two dimensional ("2D") bubble chart presentation 50 in accordance with the prior art. And, FIG. 6 is a screen capture illustrating an exemplary three dimensional ("3D") bubble chart presentation 60 in accordance with the prior art. Bubble charts display data with varying sized bubbles. The size of the bubble is dependent on a third variable. It is possible to change the bubble to any symbol with some toolkits. One can use a 2D bubble chart to show three variables as shown in FIG. 5 or a 3D bubble chart that shows the change in four variables as shown in FIG. 6. Bubble charts are commonly used. However, they are not interactive, do not support drill down, and do not support movement within a category grid row or column.

FIG. 7 is a screen capture illustrating an exemplary "LiveRAC" presentation 70 in accordance with the prior art. The LiveRAC presentation as shown in FIG. 7 allows users to view large amounts of system management data using a matrix of charts. However, LiveRAC does not update charts in real-time and does not indicate potential changes in statistics to users.

FIG. 8 is a screen capture illustrating an exemplary Google™ Motion Chart presentation 80 in accordance with the prior art. One of the views in Google Motion Chart uses bubbles to explore several indicators over time. The location of bubbles in the motion chart can move over time across the entire grid in both the x and y directions. However, it is not possible to drill down into lower level grid categories while maintaining a view of the higher level statistics.

A need therefore exists for an improved method and system for presenting hierarchical time series data. Accordingly, a solution that addresses, at least in part, the above and other shortcomings is desired.

SUMMARY OF THE INVENTION

According to one aspect of the invention, there is provided a method for presenting detailed information for an item within overview information on a display screen, comprising: displaying a first presentation of the overview information on the display screen, the overview information being presented on one or more lines of a grid; receiving a signal selecting the item from the first presentation; generating a second presentation by displacing the overview information at least partially away from a region in the first presentation and inserting the detailed information for the item into the region, wherein the overview information remains at least partially visible in the second presentation to provide context for the detailed information in the region, wherein the displacing displaces the one or more lines of the grid away from the region without distorting the lines, and wherein the inserting inserts one or more additional lines into the grid in the region upon which the detailed information is presented; and, displaying the second presentation on the display screen.

In the above method, the overview information may be presented on the grid as one or more symbols corresponding to respective ones of one or more first and second categories of data. The grid may list the one or more first categories of data along a first axis and the one or more second categories of data along a second axis. The one or more first categories of data may be one or more transactions and the one or more second categories of data may be one or more statistics relating to the one or more transactions. The item may be one of the one or more transactions or one or more statistics. The item may be a count for one of the one or more transactions or one or more statistics. The region may be a region of the grid proximate to the item. The displacing may include displacing one or more symbols away from the region. The detailed information may be presented as one or more symbols corresponding to respective sub-categories of the one or more transactions or one or more statistics. The inserting may include inserting the one or more symbols corresponding to respective sub-categories of the one or more transactions or one or more statistics into the region. The one or more symbols may be one or more circles or one or more bubbles. The sizes, colours, or positions within the grid of the one or more symbols for a transaction or sub-categories of a transaction may correspond to values of the one or more statistics for the transaction or the sub-categories of the transaction. The values and hence the sizes, colours, or positions within the grid may be updated in real-time. The values and hence the sizes, colours, or positions within the grid may be updated by way of animation to smooth visual transitions. At least one of the one or more symbols for a transaction or sub-categories of a transaction may provide an indication of present and past values of the one or more statistics for the transaction or the sub-categories of the transaction. The values and hence the indication may be updated in real-time. The overview information in the second presentation may be presented in a colour, shade, or transparency level different from that used in the first presentation. The overview information in the second presentation may be presented at a reduced scale with respect to that used in the first presentation. The detailed information may partially overlap the overview information in the second presentation. The overview information and detailed information may be hierarchical time series data. And, the detailed information may be presented as one or more line graphs.

In accordance with further aspects of the present invention there is provided an apparatus such as a data processing system, a method for adapting these, as well as articles of manufacture such as a computer readable medium (or product) and computer program product having program instructions recorded thereon for practising the method of the invention.

BRIEF DESCRIPTION OF THE DRAWINGS

Further features and advantages of the embodiments of the present invention will become apparent from the following detailed description, taken in combination with the appended drawings, in which.

It will be noted that throughout the appended drawings, like features are identified by like reference numerals.

DETAILED DESCRIPTION OF THE PREFERRED EMBODIMENTS

Figure 1:
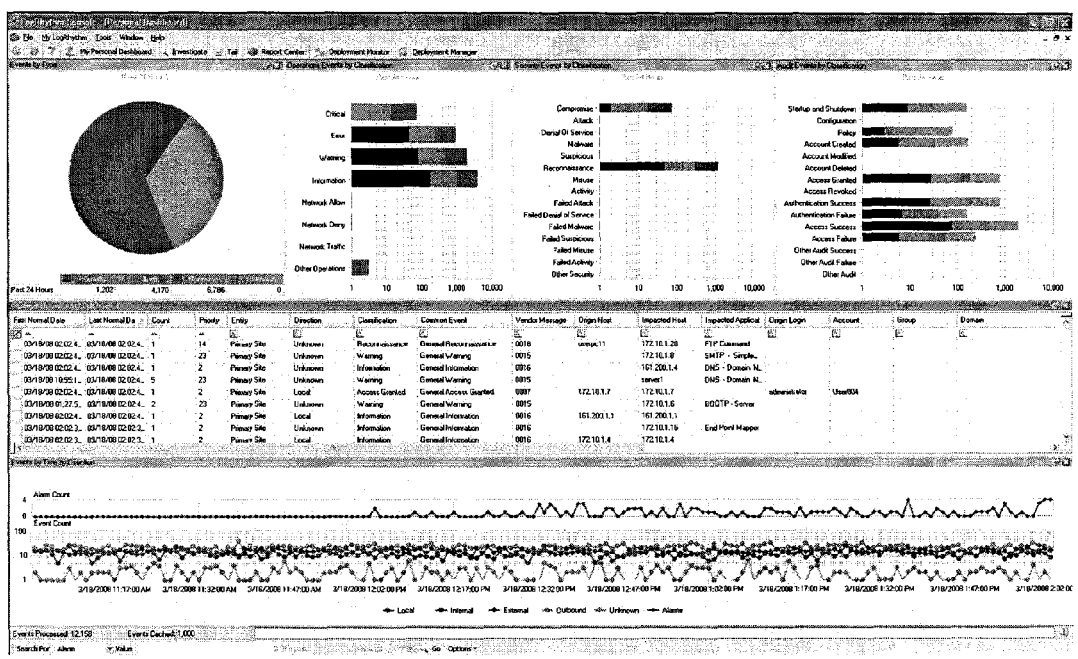
FIG. 1 is a screen capture illustrating an exemplary dashboard presentation with widgets and logs in accordance with the prior art.
Figure 2:
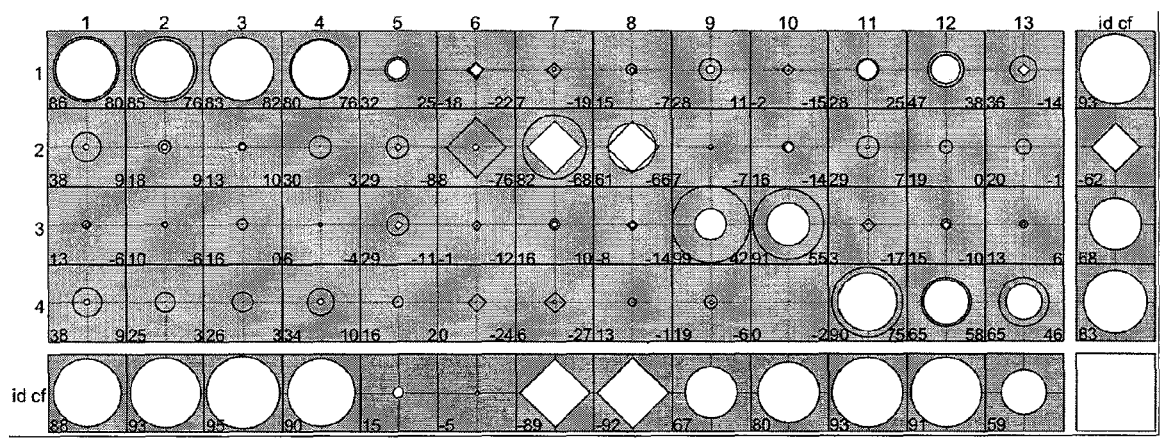
FIG. 2 is a screen capture illustrating an exemplary tableplot presentation in accordance with the prior art.
Figure 3:
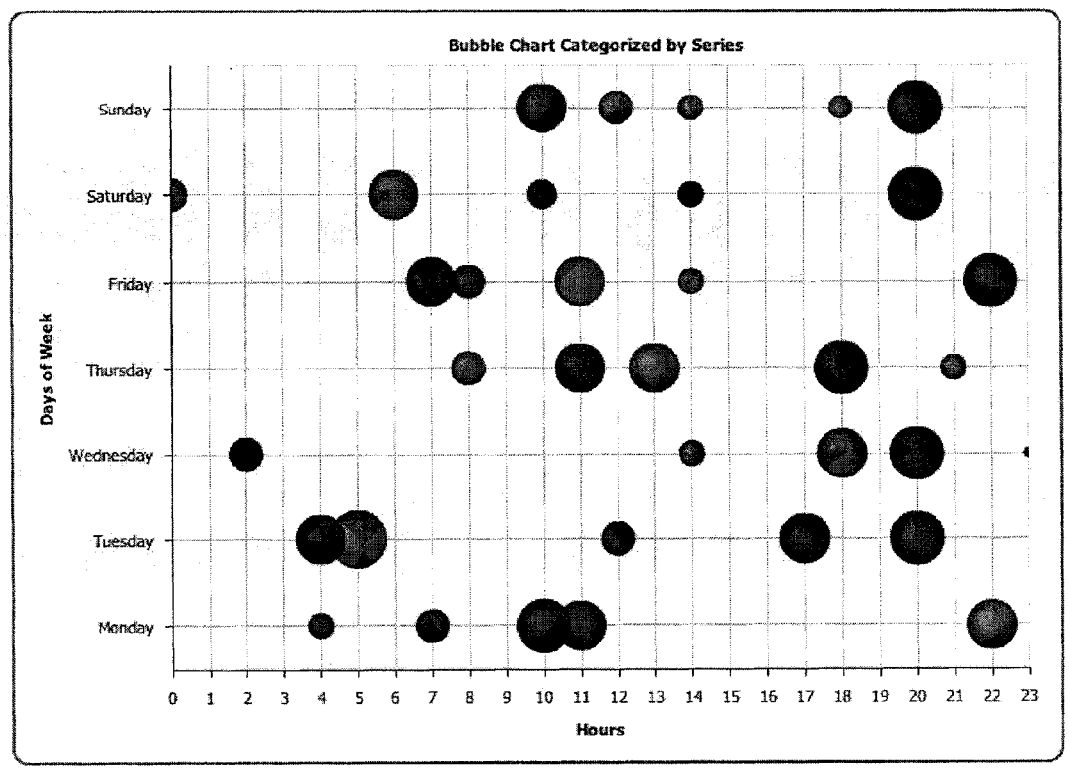
FIG. 3 is a screen capture illustrating an exemplary categorized bubble chart presentation with two categories in accordance with the prior art.
Figure 4:
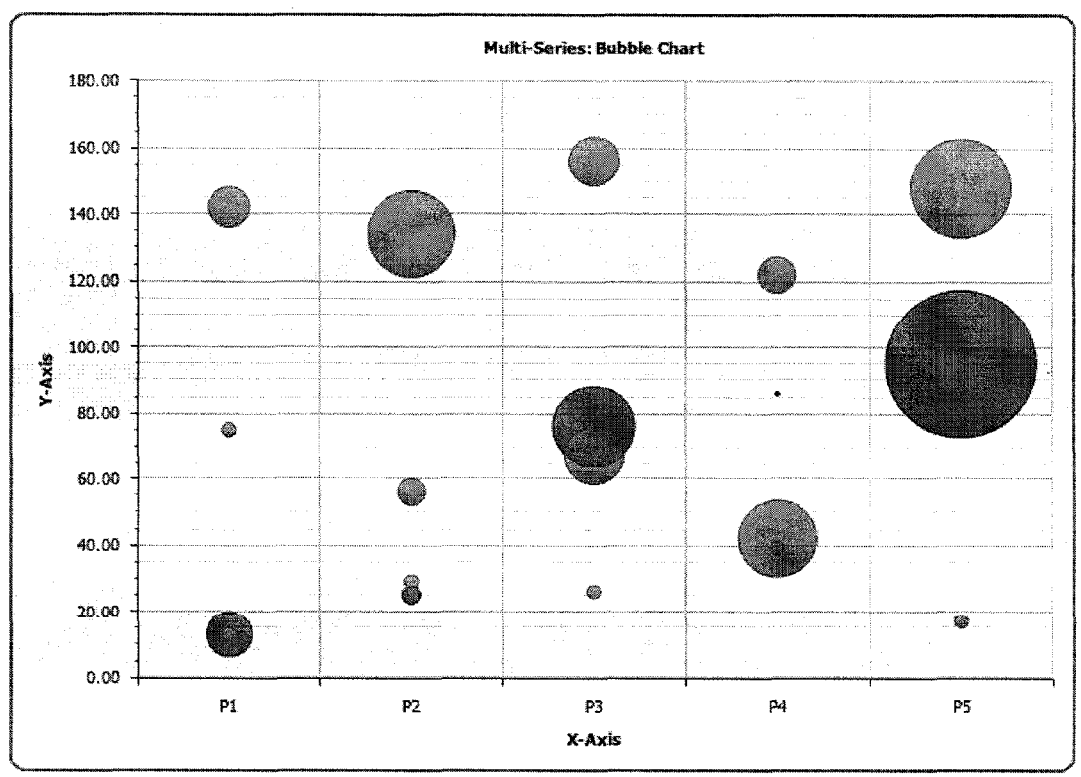
FIG. 4 is a screen capture illustrating an exemplary categorized bubble chart presentation with one category and one free axis (vertical) in accordance with the prior art.
Figure 5:
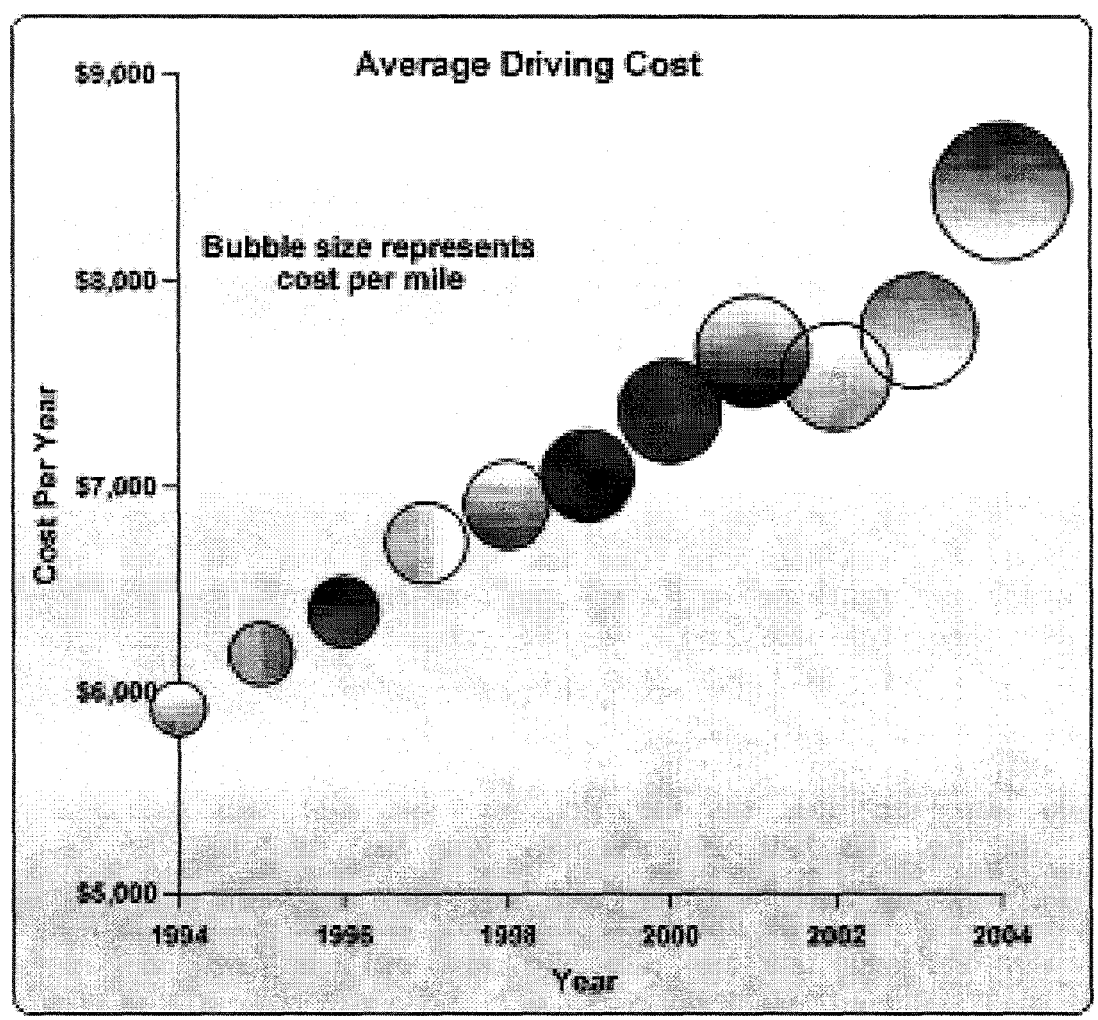
FIG. 5 is a screen capture illustrating an exemplary two dimensional ("2D") bubble chart presentation in accordance with the prior art.
Figure 6:
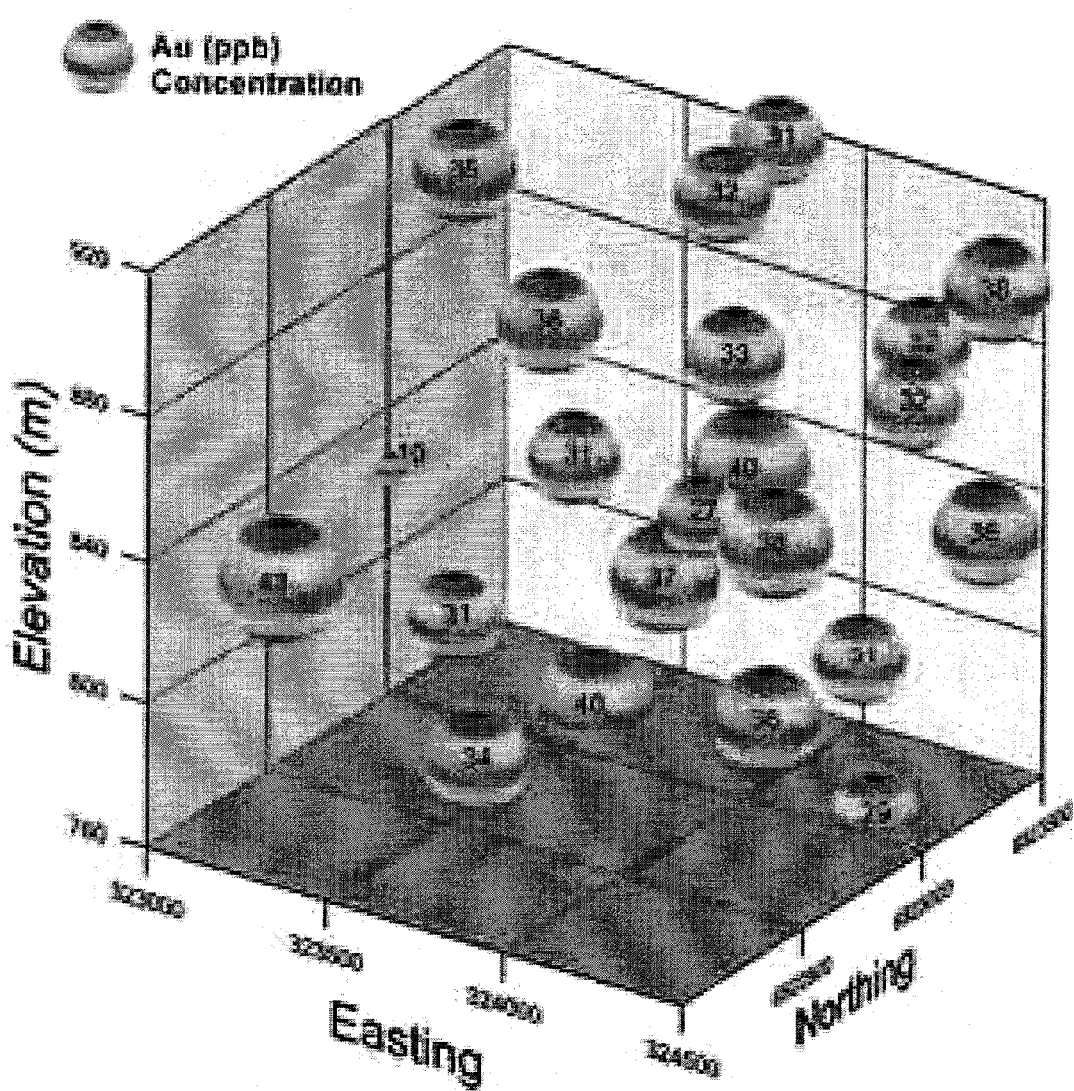
FIG. 6 is a screen capture illustrating an exemplary three dimensional ("3D") bubble chart presentation in accordance with the prior art.
Figure 7:
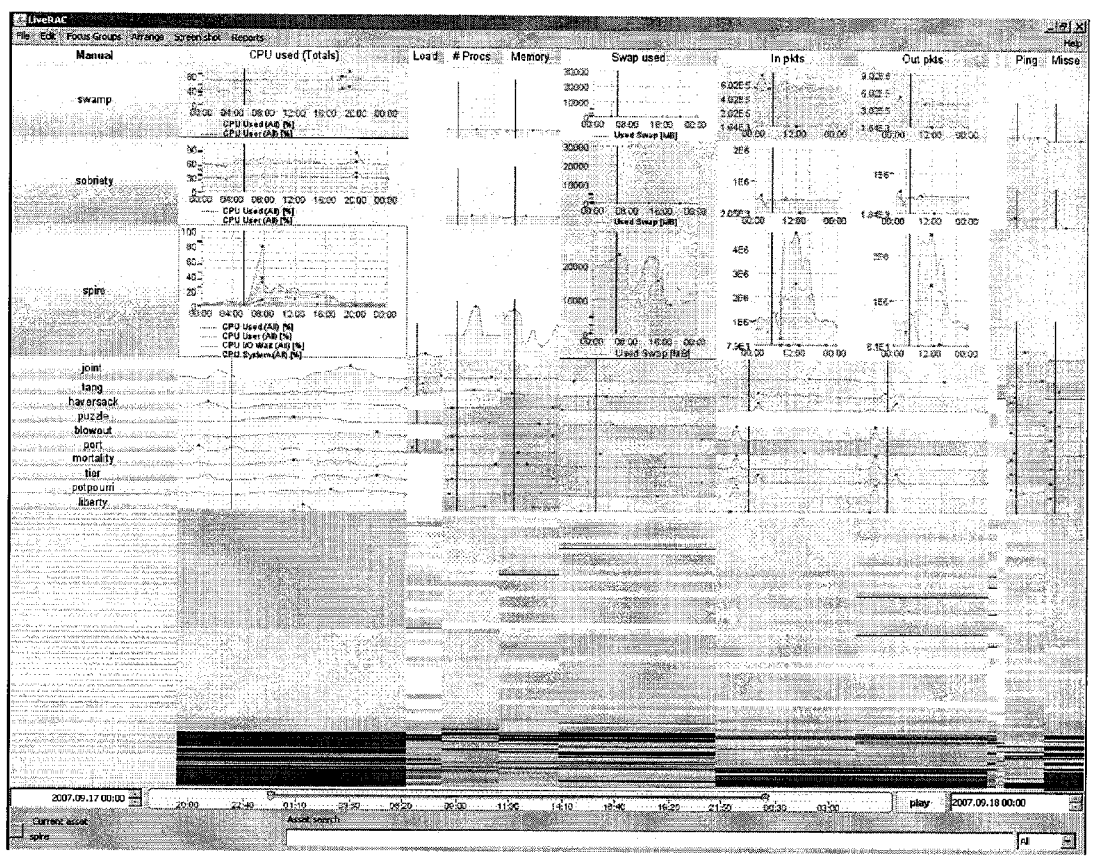
FIG. 7 is a screen capture illustrating an exemplary "LiveRAC" presentation in accordance with the prior art.
Figure 8:
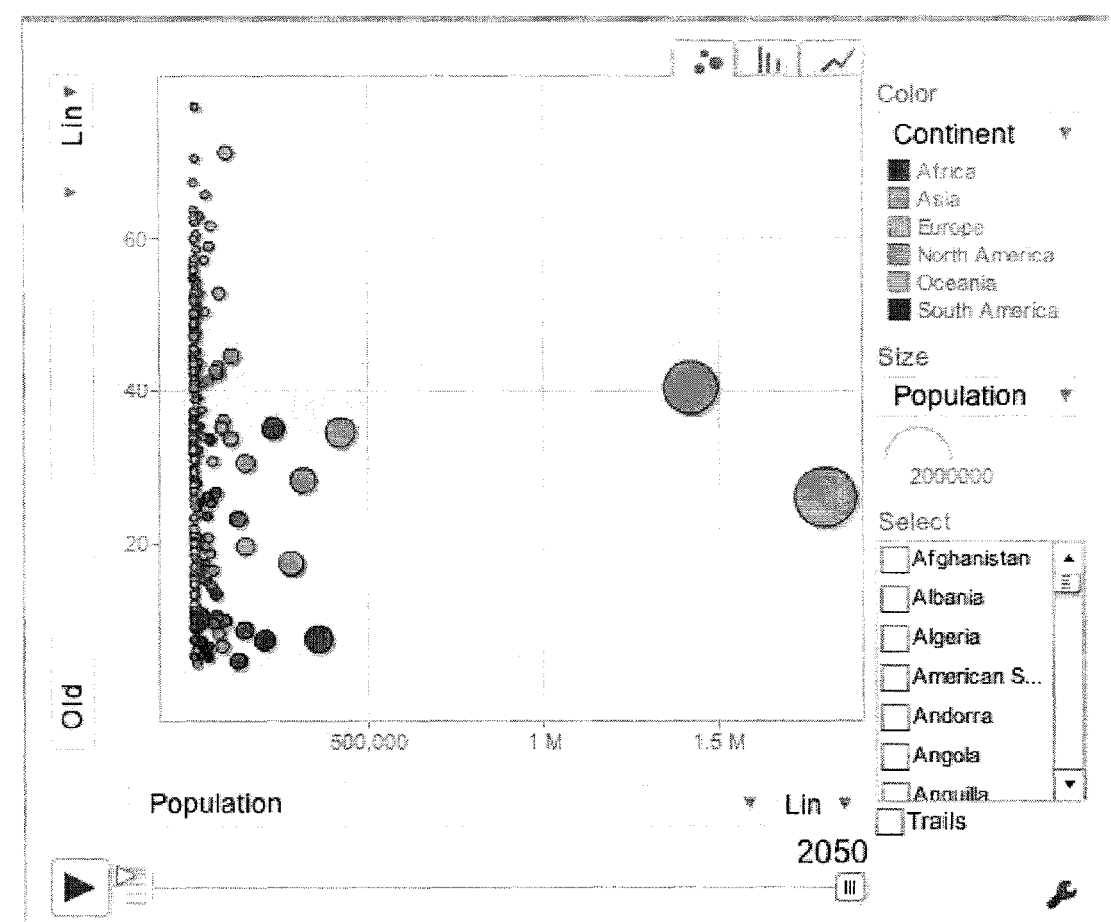
FIG. 8 is a screen capture illustrating an exemplary Google™ Motion Chart presentation in accordance with the prior art.

In the following description, details are set forth to provide an understanding of the invention. In some instances, certain software, circuits, structures and methods have not been described or shown in detail in order not to obscure the invention. The term "data processing system" is used herein to refer to any machine for processing data, including the computer systems, mobile devices, and network arrangements described herein. The present invention may be implemented in any computer programming language provided that the operating system of the data processing system provides the facilities that may support the requirements of the present invention. Any limitations presented would be a result of a particular type of operating system or computer programming language and would not be a limitation of the present invention. The present invention may also be implemented in hardware or in a combination of hardware and software.

As mentioned above, systems involving large amounts of complex data, such as transaction networks and multipurpose sensor systems, are difficult to monitor effectively for some of the following reasons. First, these systems involve extremely large numbers of different types of indicators. Second, the applicable indicators result from examination of the data being monitored. For example, in a transaction network involving many types of transactions, measuring the "average transaction dollar value" may only be applicable for financial transactions. Third, groups of indicators being monitored have different value ranges indicating whether their operation is "normal", "good", "bad", etc. Fourth, groups of indicators being monitored have different "thresholds" indicating whether an external action is required.

In such networks, it is useful to group the data into categories and sub-categories based on: (a) the type of data being sensed; and, (b) some attribute that can be readily understood by the user (e.g., geographical location in the case of a transaction network, brake subsystem in the case of monitoring an automobile system, etc.). The user must then be able to "drill down" into the various groupings to get increasingly detailed data.

For such an interface to be useful, it should provide users with at least some of the following features for real-time viewing of hierarchical time series data. First, the ability to view the overall health of the system at a glance. Second, the ability to view the trend of one or more statistics in real-time. Third, the ability to "drill down" to see current values of key statistics in sub-categories (e.g., such as location, network type, or transaction type) in real-time displaying many data points in a reasonable way. Fourth, the ability to view a log of data points that have contributed to the value shown to see how the underlying sensor, transaction, or other networked device contributed to the displayed value. Fifth, the ability for the user to be signalled visually when important changes take place. Note that the above should be accomplished without losing the view of the overall health of the managed system and without losing the "context" of the user's selection.

According to one embodiment, there is provided a real-time graphical user interface ("GUI") for displaying the overall health of a large distributed system such as a sensor network, a network of servers and other devices, or a transaction network, while allowing end users to drill down for more detailed statistics or related data points. The GUI may include a grid or band made up of circular indicators where the grid/band in which the indicator is placed represents an attribute of the statistic, its size indicates the number of statistics samples within a sample time interval, its location within the grid cell/band indicates an average or other mathematical calculation on the samples, its colour indicates priority or other classification information of importance to the user, and animation features such as a "halo" or "tail" serve to catch the user's attention. Users may interact with the user interface to drill down and change the indicators to show trends over time. The context of the current view is maintained by moving "summary" or "overview" indicators aside using animation rather than removing them, allowing user to see detailed information while maintaining a high level view of the summary statistics. A log is linked to the grid/band to display the data points and sources of data associated with the position of indicators (i.e., the cell/band) in the GUI over time. The log allows users to view more detailed information on the data points associated with the indicators.

According to one embodiment, there is provided a GUI for viewing multiple time series statistics in real-time (or offline in a "play back" mode). The GUI displays the value of many statistics as circles or bubbles on a grid combined with the following features. First, the size of the bubble within a grid cell corresponds to the value of the statistic and is updated in real-time. Updating the bubble size in real-time allows users to view the changing values of the statistics. The use of animation ensures that the user's attention is attracted to those bubbles that change significantly and quickly, signalling important changes. Second, the vertical position of a bubble within a grid cell can be used to indicate the statistic value relative to what is considered "normal" in a certain category. Third, drill down is accomplished by interacting with the grid. For example, by clicking on a vertical or horizontal grid axis, the GUI reveals a statistic sub-category and new bubbles for each category in that row or column. Fourth, when revealing a statistic sub-category, parent statistics are moved aside using animation to allow the user to maintain a high level view of transactions while investigating lower level statistics. Breadcrumbs, a trail displaying the previously selected data in the hierarchy, may be used on one or more axis to make more room for parent statistics. Fifth, by interacting with items on the axis (e.g., clicking on a category), or the bubbles themselves, the associated source of statistics such as a filtered transaction log can be revealed in another pane or window. Sixth, to reveal the trend of a statistic over a longer period of time, a bubble can be changed to a graph visualization or concentric rings with a ghosting effect to show the statistic's value over time. The ghosting effect displays the rings with varying levels of transparency. For example, the most recent values may be displayed using the most opaque colour or shade while earlier values may be displayed using increasing levels of transparency. Seventh, other object attributes (e.g., colour, colour density, and bubble shape) may be used to attract attention to bubbles displaying high priority information, new information, etc.

Figure 21:
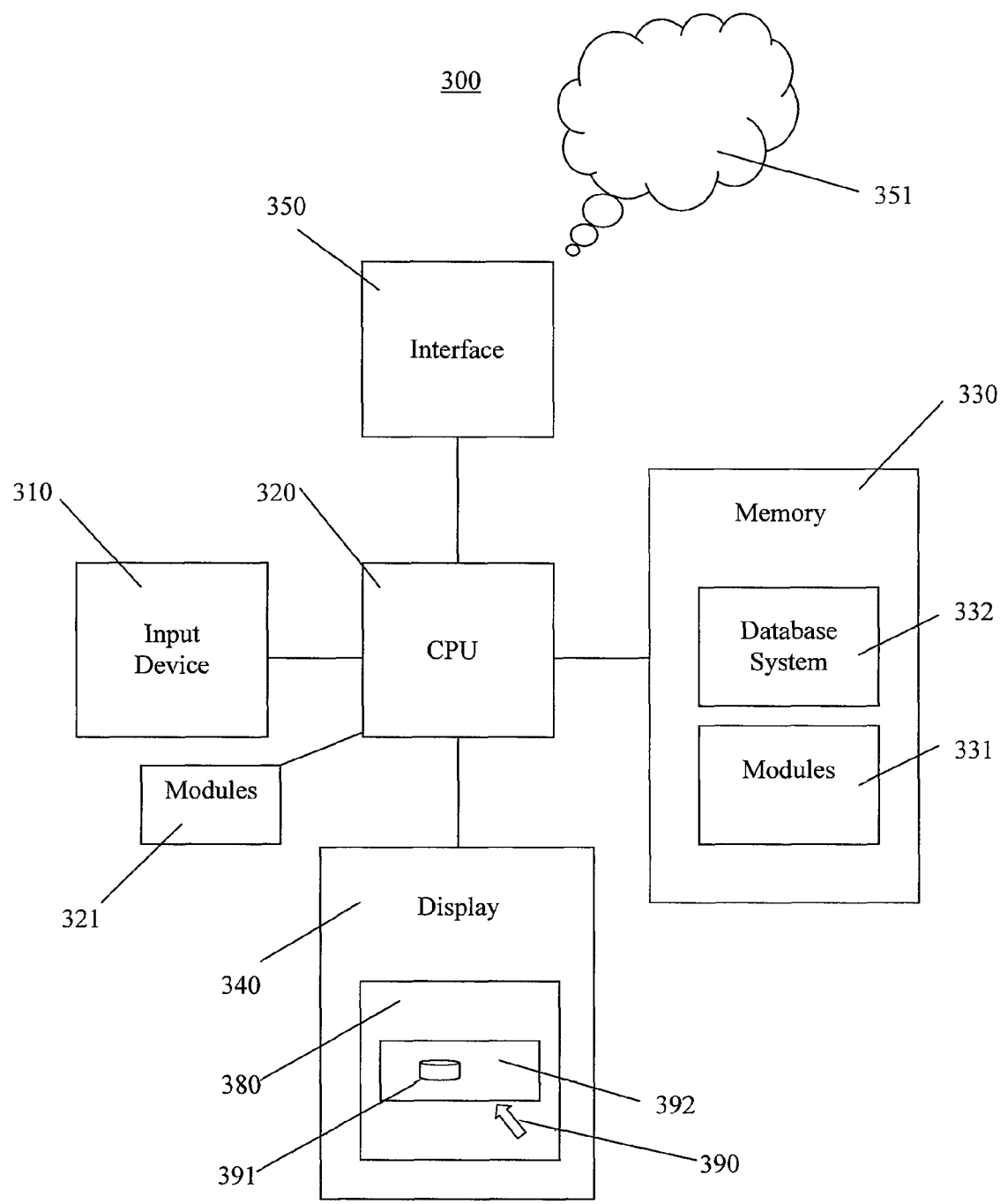
FIG. 21 is a block diagram illustrating a data processing system in accordance with an embodiment of the invention; and, FIG. 22 is a flow chart illustrating operations of modules within a data processing system for presenting detailed information for an item within overview information on a display screen, in accordance with an embodiment of the invention.

FIG. 21 is a block diagram illustrating a data processing system 300 in accordance with an embodiment of the invention. The data processing system 300 is suitable for generating, displaying, and adjusting presentations in conjunction with a graphical user interface ("GUI"), as described below. The data processing system 300 may be a client and/or server in a client/server system (e.g., 900). For example, the data processing system 300 may be a server system or a personal computer ("PC") system. The data processing system 300 may also be a mobile device or other wireless, portable, or handheld device. The data processing system 300 includes an input device 310, a central processing unit ("CPU") 320, memory 330, a display 340, and an interface device 350. The input device 310 may include a keyboard, a mouse, a trackball, a touch sensitive surface or screen, a position tracking device, an eye tracking device, or a similar device. The display 340 may include a computer screen, television screen, display screen, terminal device, a touch sensitive display surface or screen, or a hardcopy producing output device such as a printer or plotter. The memory 330 may include a variety of storage devices including internal memory and external mass storage typically arranged in a hierarchy of storage as understood by those skilled in the art. For example, the memory 330 may include databases, random access memory ("RAM"), read-only memory ("ROM"), flash memory, and/or disk devices. The interface device 350 may include one or more network connections. The data processing system 300 may be adapted for communicating with other data processing systems (e.g., similar to data processing system 300) over a network 351 via the interface device 350. For example, the interface device 350 may include an interface to a network 351 such as the Internet and/or another wired or wireless network (e.g., a wireless local area network ("WLAN"), a cellular telephone network, etc.). As such, the interface 350 may include suitable transmitters, receivers, antennae, etc. Thus, the data processing system 300 may be linked to other data processing systems by the network 351. The CPU 320 may include or be operatively coupled to dedicated coprocessors, memory devices, or other hardware modules 321. The CPU 320 is operatively coupled to the memory 330 which stores an operating system (e.g., 331) for general management of the system 300. The CPU 320 is operatively coupled to the input device 310 for receiving user commands or queries and for displaying the results of these commands or queries to the user on the display 340. Commands and queries may also be received via the interface device 350 and results may be transmitted via the interface device 350. The data processing system 300 may include a database system 332 (or store) for storing data and programming information. The database system 332 may include a database management system and a database and may be stored in the memory 330 of the data processing system 300. In general, the data processing system 300 has stored therein data representing sequences of instructions which when executed cause the method described herein to be performed. Of course, the data processing system 300 may contain additional software and hardware a description of which is not necessary for understanding the invention.

Thus, the data processing system 300 includes computer executable programmed instructions for directing the system 300 to implement the embodiments of the present invention. The programmed instructions may be embodied in one or more hardware modules 321 or software modules 331 resident in the memory 330 of the data processing system 300 or elsewhere (e.g., 320). Alternatively, the programmed instructions may be embodied on a computer readable medium (or product) (e.g., a compact disk ("CD"), a floppy disk, etc.) which may be used for transporting the programmed instructions to the memory 330 of the data processing system 300. Alternatively, the programmed instructions may be embedded in a computer-readable signal or signal-bearing medium (or product) that is uploaded to a network 351 by a vendor or supplier of the programmed instructions, and this signal or signal-bearing medium may be downloaded through an interface (e.g., 350) to the data processing system 300 from the network 351 by end users or potential buyers.

A user may interact with the data processing system 300 and its hardware and software modules 321, 331 using a graphical user interface ("GUI") 380. The GUI 380 may be used for monitoring, managing, and accessing the data processing system 300. GUIs are supported by common operating systems and provide a display format which enables a user to choose commands, execute application programs, manage computer files, and perform other functions by selecting pictorial representations known as icons, or items from a menu through use of an input device 310 such as a mouse. In general, a GUI is used to convey information to and receive commands from users and generally includes a variety of GUI objects or controls, including icons, toolbars, drop-down menus, text, dialog boxes, buttons, and the like. A user typically interacts with a GUI 380 presented on a display 340 by using an input device (e.g., a mouse) 310 to position a pointer or cursor 390 over an object (e.g., an icon) 391 and by selecting or "clicking" on the object 391. Typically, a GUI based system presents application, system status, and other information to the user in one or more "windows" appearing on the display 340. A window 392 is a more or less rectangular area within the display 340 in which a user may view an application or a document. Such a window 392 may be open, closed, displayed full screen, reduced to an icon, increased or reduced in size, or moved to different areas of the display 340. Multiple windows may be displayed simultaneously, such as: windows included within other windows, windows overlapping other windows, or windows tiled within the display area.

Figure 9:
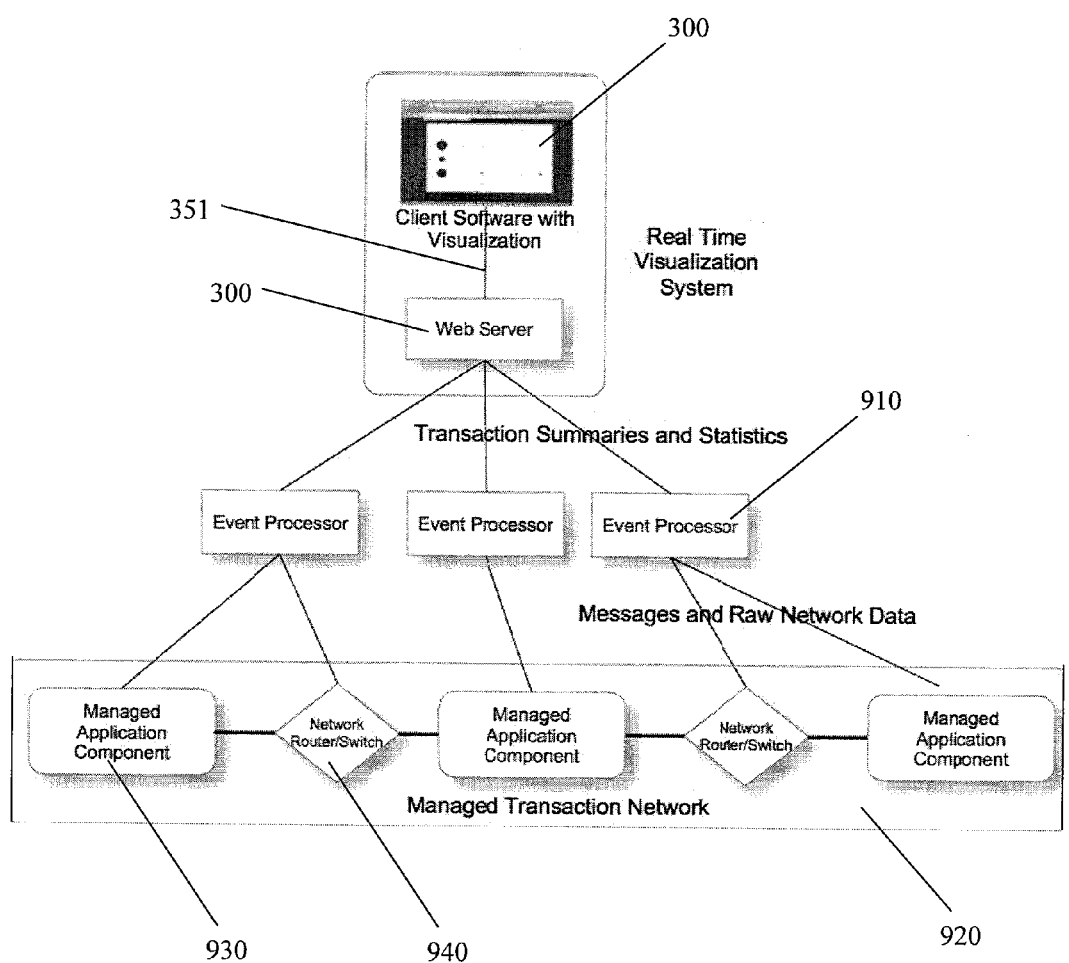
FIG. 9 is a block diagram illustrating a real-time visualization system in accordance with an embodiment of the invention.

FIG. 9 is a block diagram illustrating a real-time visualization system 900 in accordance with an embodiment of the invention. The real-time visualization system 900 allows users to interact and view network transactions, complex management information, and other sensor data. For real-time display, the real-time visualization system 900 subscribes and unsubscribes to data and statistics feeds from a source of data as the user interacts with the GUI 380. To support real-time display, additional subscriptions are made to sub-statistics and transaction feeds when drilling down. When collapsing a view, subscriptions are removed. The system 900 consists of client software 331 running on a web browser at a client (e.g., 300) and communicating with a web server (e.g., 300). The web server 300 in turn communicates with an event processor 910, or multiple distributed event processors 910, that provides transaction feeds and generate statistics from these feeds. Event processors 910 generate transaction summaries and statistics from data collected from a managed transaction network 920, either from application components 930 or the network 940.

According to one embodiment, the client software 331 presents the GUI 380 described below. The web server 300 and event processors 910 supply the client software 331 with the required transaction and statistics streams on demand.

According to another embodiment, the client 300 and client software 331 may communicate directly (e.g., via its interface 350) with networked devices or sensor networks.

According to one embodiment, the invention may also be used to play back time series data in an off-line mode. In this embodiment, the data may be supplied directly from one or more data logs, or generated from these logs on demand.

Figure 10:
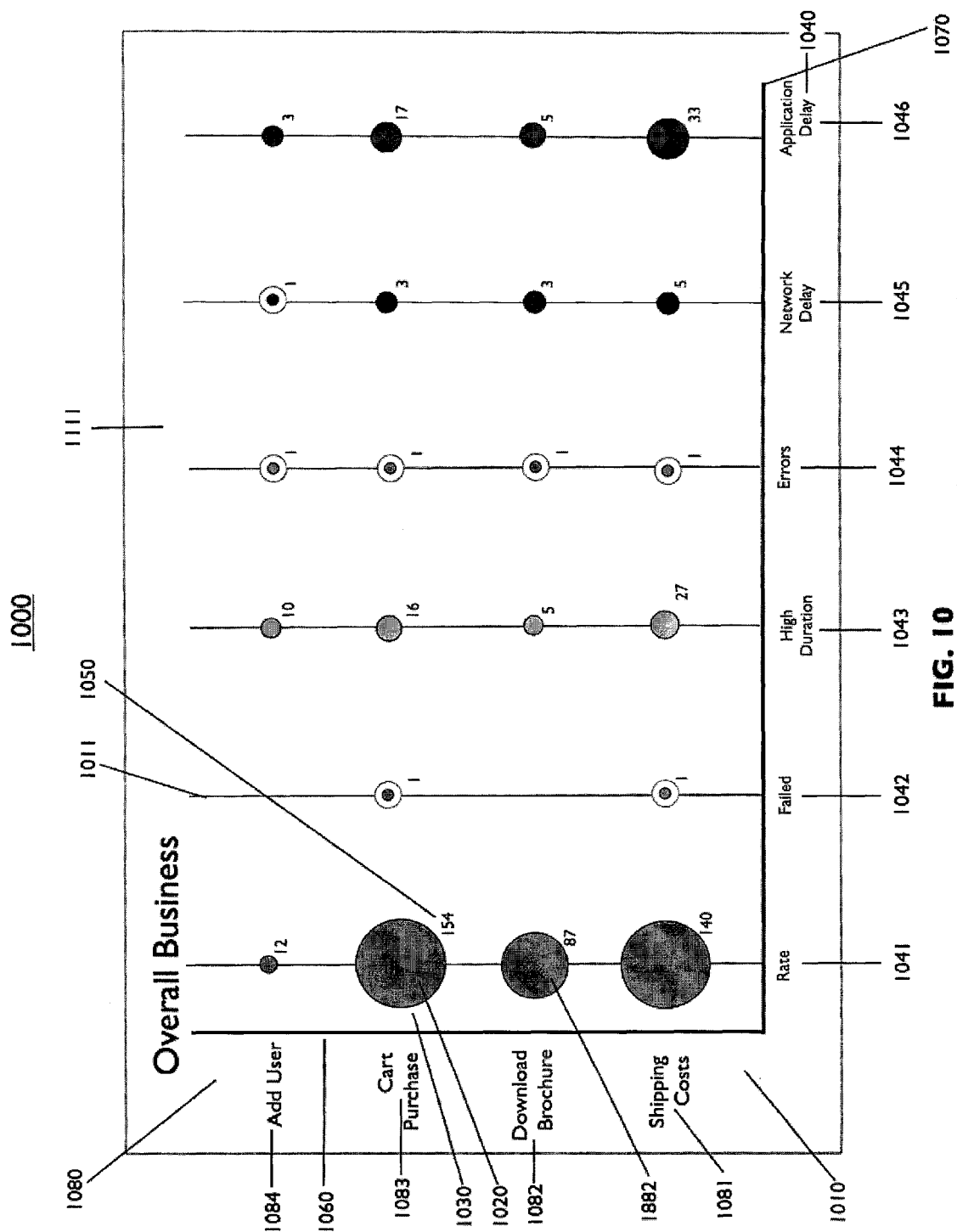
FIG. 10 is a screen capture illustrating an initial overview presentation of a graphical user interface ("GUI") for a data processing system in accordance with an embodiment of the invention.

FIG. 10 is a screen capture illustrating an initial overview presentation 1000 of a graphical user interface ("GUI") 380 for a data processing system 300 in accordance with an embodiment of the invention. The GUI 380 and its presentations (e.g., 1000) may be displayed, for example, on the display 340 of the data processing system 300. The initial overview presentation 1000 includes a grid 1010 composed of grid lines 1011 and containing circles or bubbles 1020 in cells 1030 that represent the current value of a statistic (e.g., 1041) for a given transaction (e.g., 1083). The use of bubbles 1020 may be advantageous as they show relative size as it changes over time, and can give users a sense of the size of a statistic 1041 at a glance. According to one embodiment, by hovering over an indicator or bubble 1020, or by configuring the presentation 1000 appropriately, the current value (e.g., "154") of the statistic (e.g., "Rate") 1041 for a given transaction (e.g., "Cart Purchase") 1083 is displayed on or near the bubble 1020 in a current value display (or count) 1050 as shown in FIG. 10. The value displayed 1050 and of the size of the bubble 1020 is updated in real-time and transitions between samples are animated smoothly to indicate trends. According to one embodiment, the size of the bubble 1020 may not be linearly related to the value of the statistic, for example, the relationship may be logarithmic and/or scaled, and configurable for the specific statistic value shown. According to one embodiment, a grid 1010 is provided with vertical 1060 and horizontal 1070 axes. Categories of high level transaction feeds (or transaction types or transactions) 1080 (e.g., "Shipping Costs" 1081, "Download Brochure" 1082, "Cart Purchase" 1083, "Add User" 1084) are listed along the vertical axis 1060 and categories of high level statistics (or statistic types or statistics) 1040 (e.g., "Rate" 1041, "Failed" 1042, "High Duration" 1043, "Errors" 1044, "Network Delay" 1045, "Application Delay" 1046) available for the transactions 1080 are listed along the horizontal axis 1070 as shown in FIG. 10. Other embodiments may contain different data and/or statistic categories on each axis 1060, 1070. For example, transactions 1080 may appear on the horizontal axes 1070 while statistics 1040 may appear on the vertical axes 1060. According to one embodiment, the transactions 1080 and statistics 1040 may be first and second categories of data 1080, 1040. According to one embodiment, the transactions 1080 may be any form of data including personal information, etc., and the statistics 1040 may relate thereto.

Figure 11:
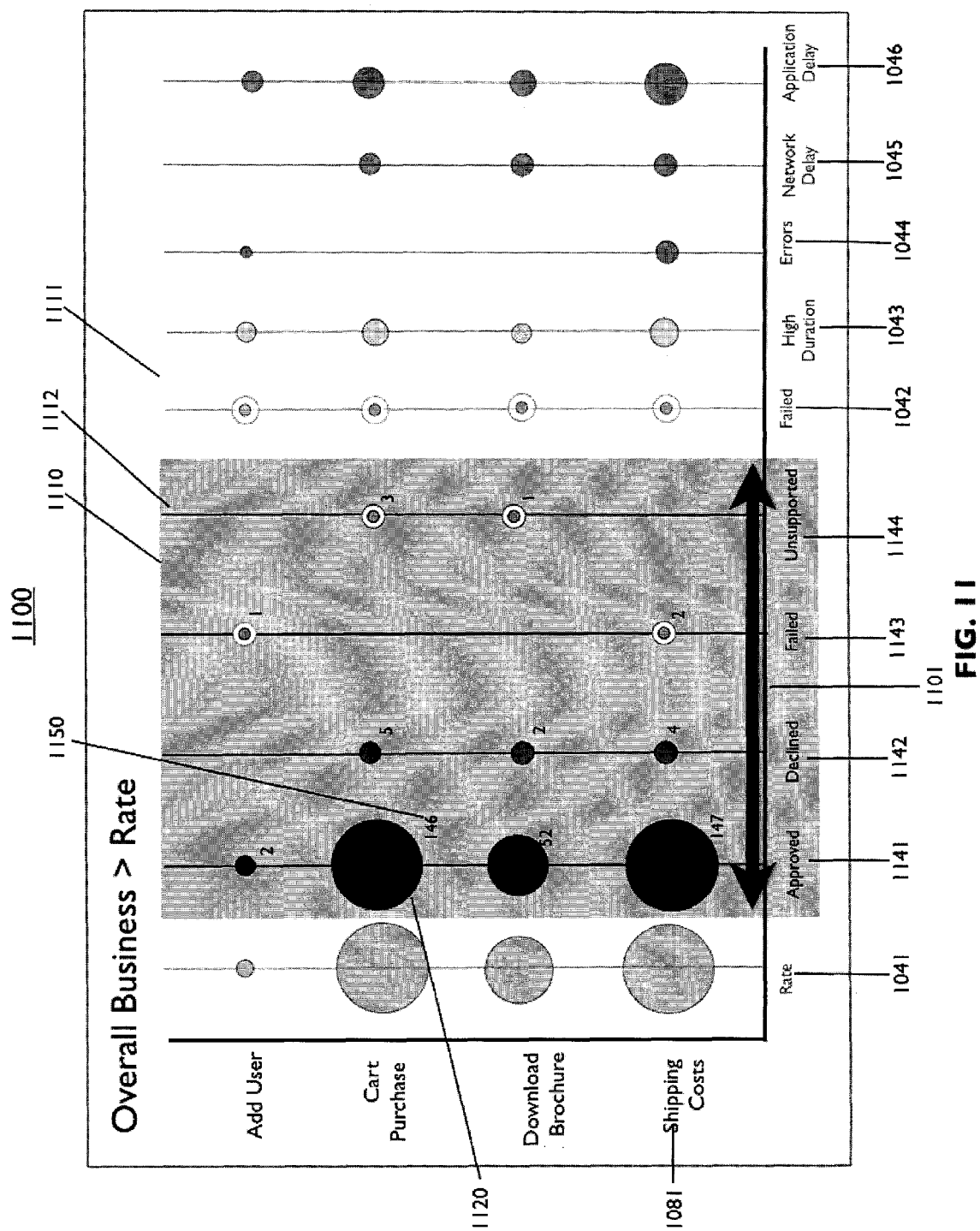
FIG. 11 is a screen capture illustrating a presentation in which a "Rate" statistic is expanded to show its components across transaction types in accordance with an embodiment of the invention.

FIG. 11 is a screen capture illustrating a presentation 1100 in which a "Rate" statistic (or item) 1041 is expanded 1101 to show its components 1141-1144 across transaction types 1080 in accordance with an embodiment of the invention. With respect to single level drill down, when the user drills down on a statistic (e.g., 1041) to get the components (e.g., 1141-1144) of the overall value of the statistic, the user selects or clicks on the statistic (i.e., its identifier or label) (e.g., 1041) on the horizontal axis 1070 (or transaction on the vertical axis 1060). Clicking on the statistic (or transaction) is only one possible embodiment, other embodiments include clicking on an icon, the axis between categories, or other active area (e.g., 1050, 1150). For example, in the case of a transaction management system (e.g., 900), to see the contributing components of the overall "Rate" statistic 1041, the "Rate" statistic 1041 is broken down into statistic sub-types, sub-statistics, sub-categories, or components 1141-1144 (e.g., "Approved" 1141, "Declined" 1142, "Failed" 1143, "Unsupported" 1144). In FIG. 11, the user has expanded the "Rate" statistic 1041 to show how the various transactions 1080 contribute to the overall value of the "Rate" statistic. For the "Shipping Costs" transaction 1081, most transactions in the last sample period were "Approved" 1141 (i.e., 147), a few were "Declined" 1142 (i.e., 4), two "Failed" 1143, and none were "Unsupported" 1144.

According to one embodiment, a box, region, or line 1110 is drawn around the sub-statistics (e.g., 1141-1144) and overall statistics (e.g., 1041-1046) are made transparent or given a different colour so as to push them into the background and highlight the statistics of interest (i.e., 1141-1144). The high level statistics (e.g., 1041-1046) are not removed from the grid 1010 but are moved or displaced (which may be animated) to the right and left to make room for the sub-statistics (e.g., 1141-1144) of interest. The box 1110 encloses statistics of interest or detailed information 1112 (i.e., 1141-1144) for the selected statistic or item 1041 in the context of high level or overview information 1111 (i.e., 1041-1046 or information presented outside the box 1110). According to one embodiment, the lines 1011 of the grid 1010 are not distorted (e.g., they remain vertical or horizontal) when they are displaced to allow the detailed information 1112 to be inserted into a region 1110 within the overview information 1111.

Figure 12:
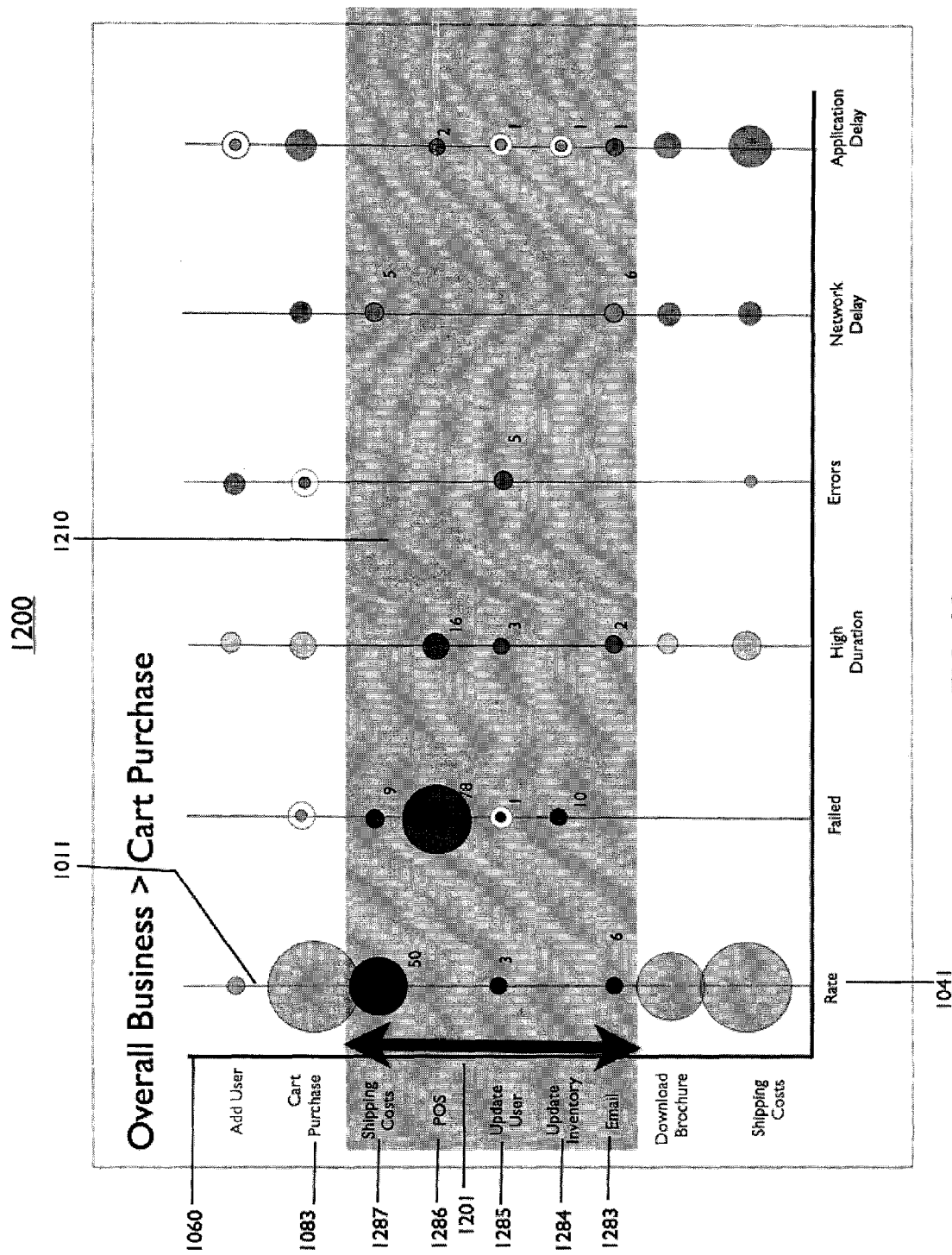
FIG. 12 is a screen capture illustrating a presentation in which a "Cart Purchase" transaction is expanded to show its components across statistic types in accordance with an embodiment of the invention.

FIG. 12 is a screen capture illustrating a presentation 1200 in which a "Cart Purchase" transaction 1083 is expanded 1201 to show its components 1283-1287 across statistic types 1040 in accordance with an embodiment of the invention. As shown in FIG. 12, similar to FIG. 11, a transaction type (e.g., 1083) may be expanded 1201 along the vertical axis 1060. For example, the transaction "Cart Purchase" 1083 may include the transaction sub-types, sub-transactions, sub-categories, or components "Email" 1283, "Update Inventory" 1284, "Update User" 1285, "POS" 1286, and "Shipping Costs" 1287.

According to one embodiment, a box or line 1210 is drawn around the sub-transactions (e.g., 1283-1287) and overall transactions (e.g., 1081-1084) are made transparent or given a different colour so as to push them into the background and highlight the transactions of interest (i.e., 1283-1287). The high level transactions (e.g., 1081-1084) are not removed from the grid 1010 but are moved or displaced (which may be animated) to the top and bottom to make room for the sub-transactions (e.g., 1283-1287) of interest.

Figure 13:
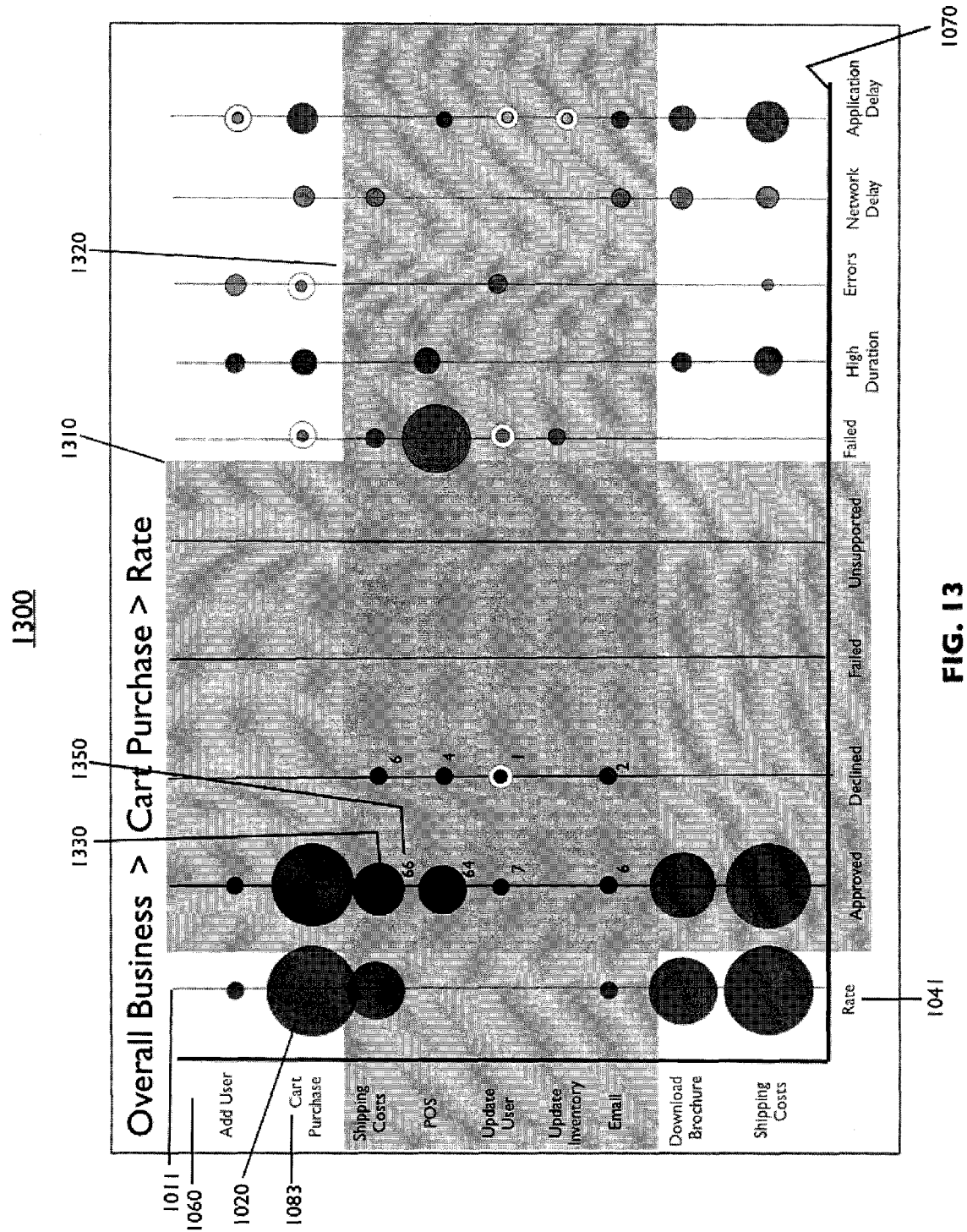
FIG. 13 is a screen capture illustrating a presentation in which the "Cart Purchase" transaction and the "Rate" statistic are expanded in accordance with an embodiment of the invention.

FIG. 13 is a screen capture illustrating a presentation 1300 in which the "Cart Purchase" transaction 1083 and the "Rate" statistic 1041 are expanded in accordance with an embodiment of the invention. The user can drill down on both axes 1060, 1070 at the same time. In FIG. 13, the user has expanded both the "Cart Purchase" transaction 1083 and "Rate" statistic 1041 to show sub-transactions and sub-statistics contributing to the overall rate. In this embodiment, transactions and statistics are moved up/down and left/right. Two overlapping boxes 1310, 1320 surround the sub-transactions and sub-statistics of interest and overall transactions and statistics are pushed into the background using transparency or different colours as shown.

To maintain the user's view on the overall statistics and transactions (e.g., Rate 1041 and Cart Purchase 1083 in FIG. 13), bubbles (e.g., 1020) on a grid line 1011 are not removed from the presentation 1300 but are moved up and down, or to the left and right, during drill down. In this way, both parent (high level) and child (sub) statistics and transactions are maintained in view. Users may also "hover" on a bubble (e.g., 1330) to see the current statistic value (e.g., 66) 1350. Users may configure the presentation 1300 so that all statistic values are shown within a bubble, or near or adjacent to a bubble, indicating all of the current values.

Figure 14:
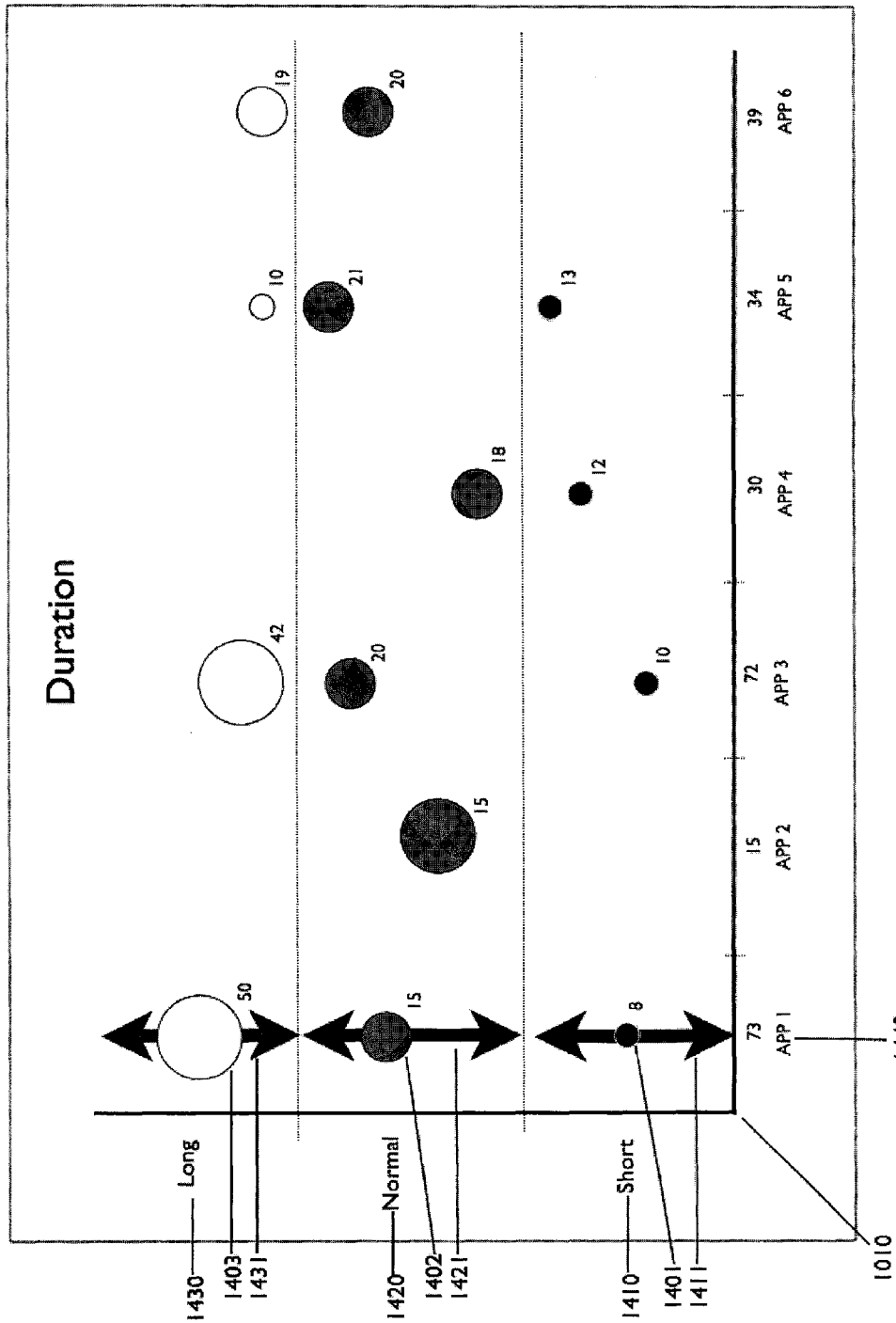
FIG. 14 is a screen capture illustrating a presentation in which bubble size indicates value, vertical position indicates relationship to average value, and colour indicates meaning or importance in accordance with an embodiment of the invention.

FIG. 14 is a screen capture illustrating a presentation 1400 in which bubble size indicates value, vertical position indicates relationship to average value, and colour indicates meaning or importance in accordance with an embodiment of the invention. In FIG. 14, bubble 1401, 1402, 1403 size indicates the value or number of transactions in three categories ("Short" 1410, "Normal" 1420, "Long" 1430). Vertical position within a horizontal band 1410, 1420, 1430 as illustrated by arrows 1411, 1421, 1431 indicates the average value of the duration of transactions in that category 1410, 1420, 1430. In addition, the colour of the bubbles 1401, 1402, 1403 indicates the meaning or importance of these transactions in identifying problems. With respect to the use of bubble size, movement and colour, there are several ways to use a bubble to indicate the value of a statistic (e.g., "APP1" 1440), namely, the size, the location on the grid, and the colour of the bubble. These indicators can be combined in various ways.

The size of the bubble 1401, 1402, 1403 may indicate the number of transactions that fall within three categories 1410, 1420, 1430 for an application 1440. The position of the bubble 1401, 1402, 1403 within the grid 1010 may indicate the relative value of the aggregated transactions within that category 1410, 1420, 1430. For example, the vertical position 1421 may indicate the average duration of all transactions that have "Normal" 1420 duration. If the average normal duration is high, the bubble 1402 appears higher in the grid location, if the average is low, the bubble 1402 appears lower in the grid location. This is illustrated in FIG. 14.

Figure 15:
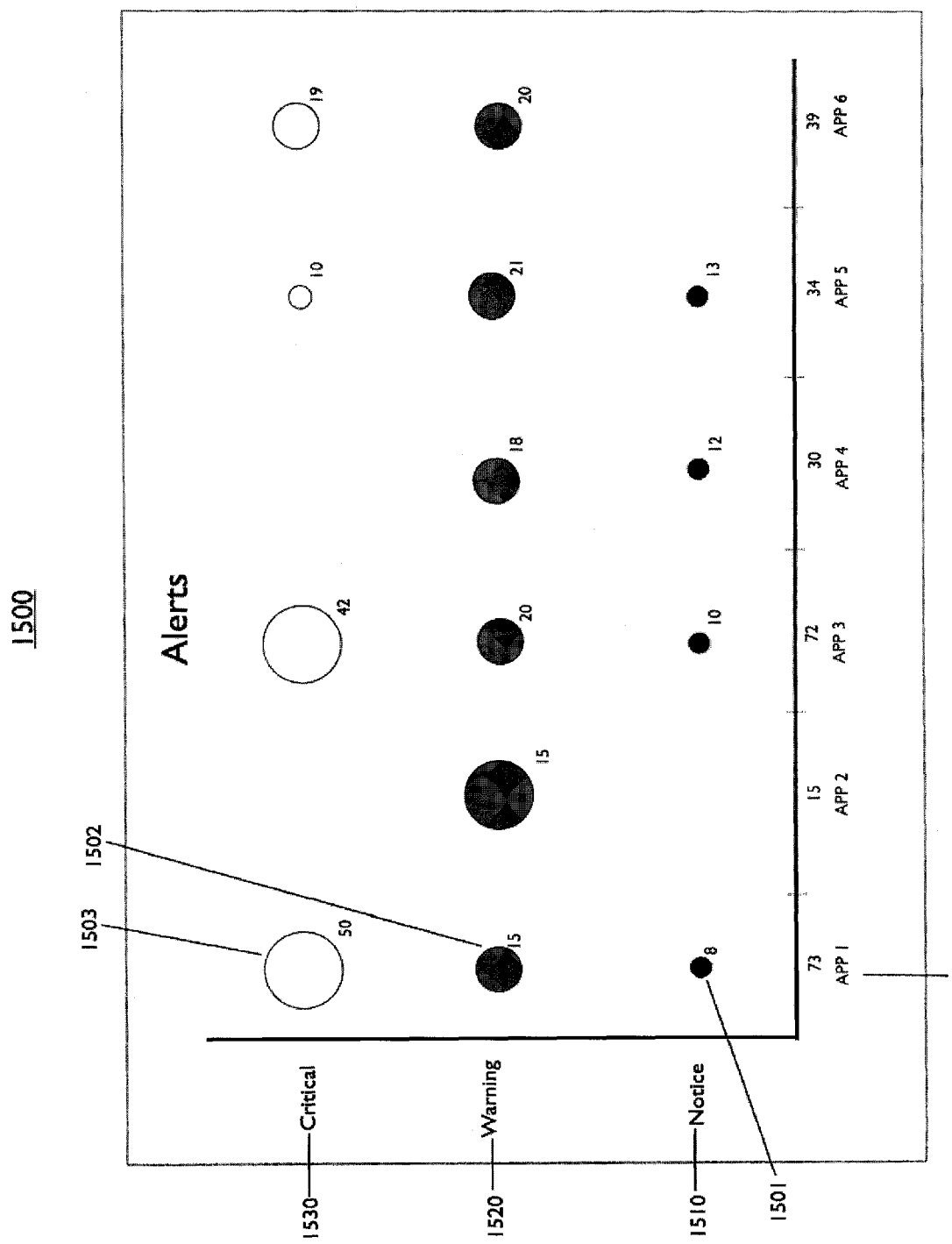
FIG. 15 is a screen capture illustrating a presentation in which bubble colour implies meaning for statistics in accordance with an embodiment of the invention.

FIG. 15 is a screen capture illustrating a presentation 1500 in which bubble colour implies meaning for statistics in accordance with an embodiment of the invention. According to one embodiment, the colour of a bubble may have meaning. For example, in a presentation 1500 indicating the status of "Alerts", the "Critical" 1530 alerts may have bubbles 1503 presented in red (or a first colour or shade), "Warning" 1520 alerts may have bubbles 1502 presented in yellow (or a second colour or shade), and "Notice" 1510 alerts may have bubbles 1501 presented in gray (or a third colour or shade) as shown in FIG. 15. The colour of bubbles 1501, 1502, 1503 may change depending on the mix of transactions in a given category. For example, if the number of "bad" or "failed" transactions is above a given threshold, the colour of the corresponding bubble may change to red.

Advantageously, graphical representations such as symbols, shape, size, colour, and position may be effective in information visualization because they are "mentally economical". This is because they are rapidly and efficiently processed by a user's pre-attentive visual system rather than using cognitive effort. Related to position, keeping things relatively static on the horizontal (or x) and vertical (or y) axes allows users to become "familiar" with where information is from a distance, or while not completely focused on the GUI 380.

The use of animation and motion may also be advantageous. Motion may elicit "pop-out" effects in a user, drawing attention to objects, even when the object is in the periphery. With this visualization, users can more easily detect large changes in statistics since their size or position changes faster. Motion may give a user an indication that the user should be paying closer attention to the object, that is, without motion, the user may not see changes unless the user is paying close attention. Because smooth motion is less disruptive than fast motion or blinking, the user's eyes are attracted to more important fast changing bubbles without disturbing the focus of attention on less important more slowly changing bubbles.

In addition, animated transitions allow the user to maintain context and position of familiar statistics while drilling down to more details. Without animation to maintain context, user errors in tracking a statistic by watching a presentation may be higher.

Figure 16A:
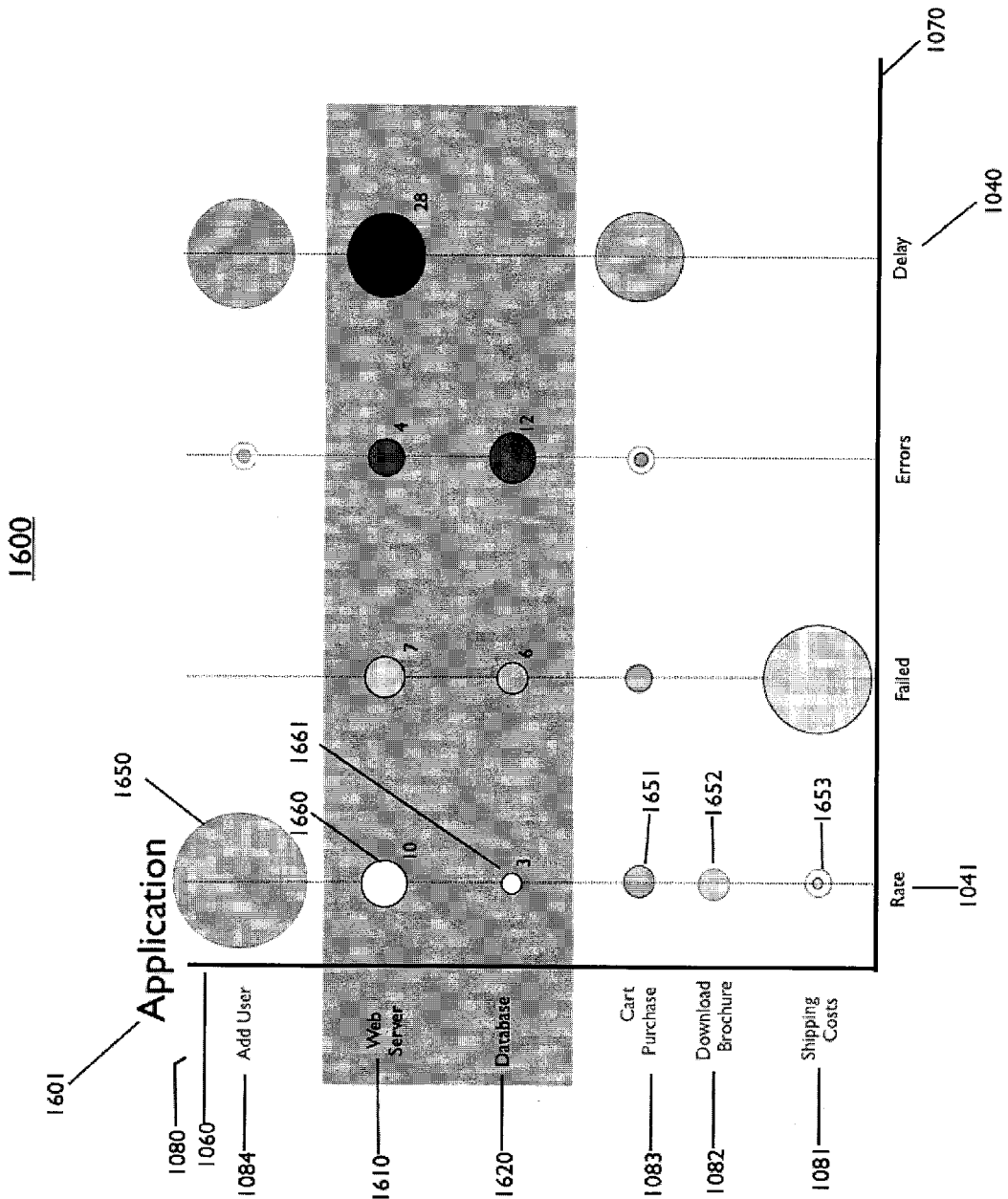
FIGS. 16A and 16B are screen captures illustrating presentations in which breadcrumbs are used to expand transactions in accordance with an embodiment of the invention.
Figure 16B:
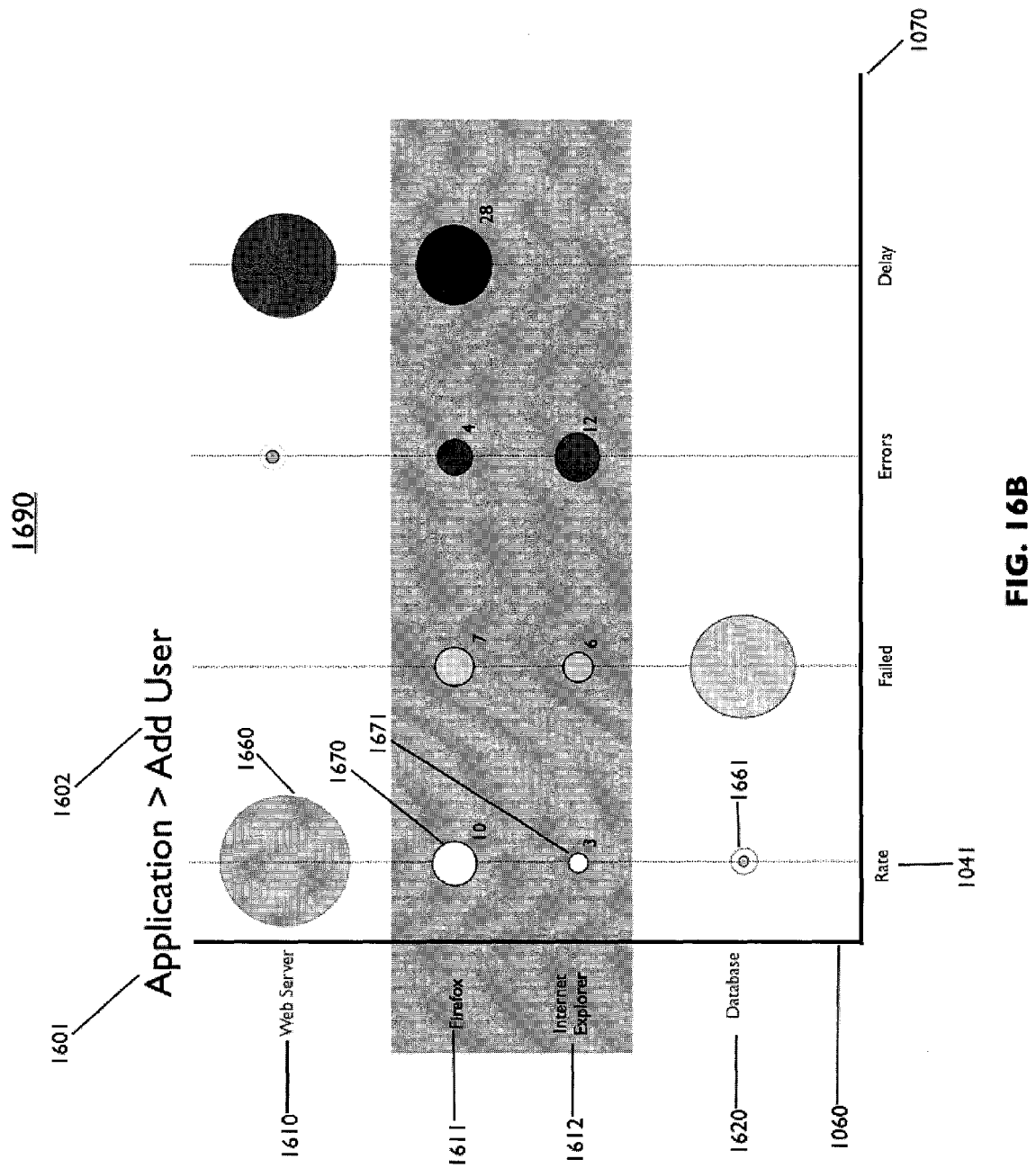

FIGS. 16A and 16B are screen captures illustrating presentations 1600, 1690 in which breadcrumbs 1601, 1602 are used to expand transactions in accordance with an embodiment of the invention. In general, breadcrumbs typically appear horizontally across the top of a presentation or page, usually below title bars or headers. They provide links back to each previous page the user navigated through to get to the current page or, in hierarchical GUI structures, the parent pages of the current one. Breadcrumbs provide a trail for the user to follow back to the starting or entry point. A greater-than sign (>) often serves as hierarchy separator, although designers may use other glyphs (such as >>), as well as various graphical treatments. In FIGS. 16A and 16B, breadcrumbs ("Application" 1601, "Add User" 1602) are used on or parallel to the horizontal axis 1070 to expand a transaction (e.g., "Web Server" 1610) to multiple levels or components (e.g., FireFox™ 1611, Internet Explorer™ 1612) while only displaying two.

With respect to multi-level drill down, the GUI 380 supports drilling down through multiple category levels or transaction components in two ways. First, by pushing aside bubbles as may be performed for a single level drill down. Second, by using axis breadcrumbs 1601, 1602. With respect to the pushing aside method (see FIG. 16A), when drilling down multiple levels by pushing higher levels aside, the higher level bubbles (e.g., 1650, 1651, 1652, 1653) become more transparent (or differently shaded or coloured), relatively smaller, and grid positions closer together as in the single-level drill down case. The deeper level of interest bubbles (e.g., 1660, 1661) remains opaque and full size. This method is generally limited to relatively few levels of drill down since all category levels and their associated bubbles are maintained on the screen. With respect to the axis breadcrumbs method (see FIG. 16B), higher levels (e.g., 1081-1084 and 1650-1653) are removed and the parent level category (e.g., "Add User" 1084) is indicated as a breadcrumb (e.g., "Add User" 1602) on or parallel to the relevant horizontal 1070 or vertical axis. Again, the deeper level of interest bubbles (e.g., 1670, 1671) may remain opaque and full size.

According to one embodiment, as shown in FIGS. 16A and 16B, the GUI 380 may be used to present various statistics for application transactions. The categories on the vertical axis 1060 are application transaction types (e.g., "Add User" 1084). Sub-categories for each application transaction are link transaction types, for example "Web Server" 1610 and "Database" 1620. Sub-categories for these are link group members. In the case of the "Web Server" 1610 link type, the transactions could be grouped by browser used, for example, Firefox™ 1611 and Internet Explorer™ 1612.

According to one embodiment, the user may need to drill down to a particular link transaction group, but the presentation 1600, 1690 may only have room for two levels. In this case, first, the user may click on the application transaction category (e.g., "Add User" 1084) to reveal the link transaction statistics (e.g., "Web Server" 1610 and "Database" 1620). The GUI 380 pushes or displaces the application categories 1083, 1084 aside as shown in FIG. 16A. To drill down to a particular link transaction group, the user may then click on one of the link transaction categories (e.g., "Web Server" 1610). This moves the application category (i.e., "Add User" 1084) to the horizontal axis breadcrumb (i.e., "Add User" 1602) making the application transaction type the parent category as shown in FIG. 16B. The link type (i.e., "Web Server" 1610) is then presented as the top category and the browser group members (i.e., Firefox™ 1611 and Internet Explorer™ 1612) are presented as the second level categories. To move up the hierarchy and collapse the top level link type category, the breadcrumbs 1601, 1602 may be selected or clicked on. This example illustrates the use of breadcrumbs 1601, 1602 only for transactions along the vertical axis 1060. However, transactions and statistics 1080, 1040 along both axes 1060, 1070 may be managed independently in this manner.

Figure 17:
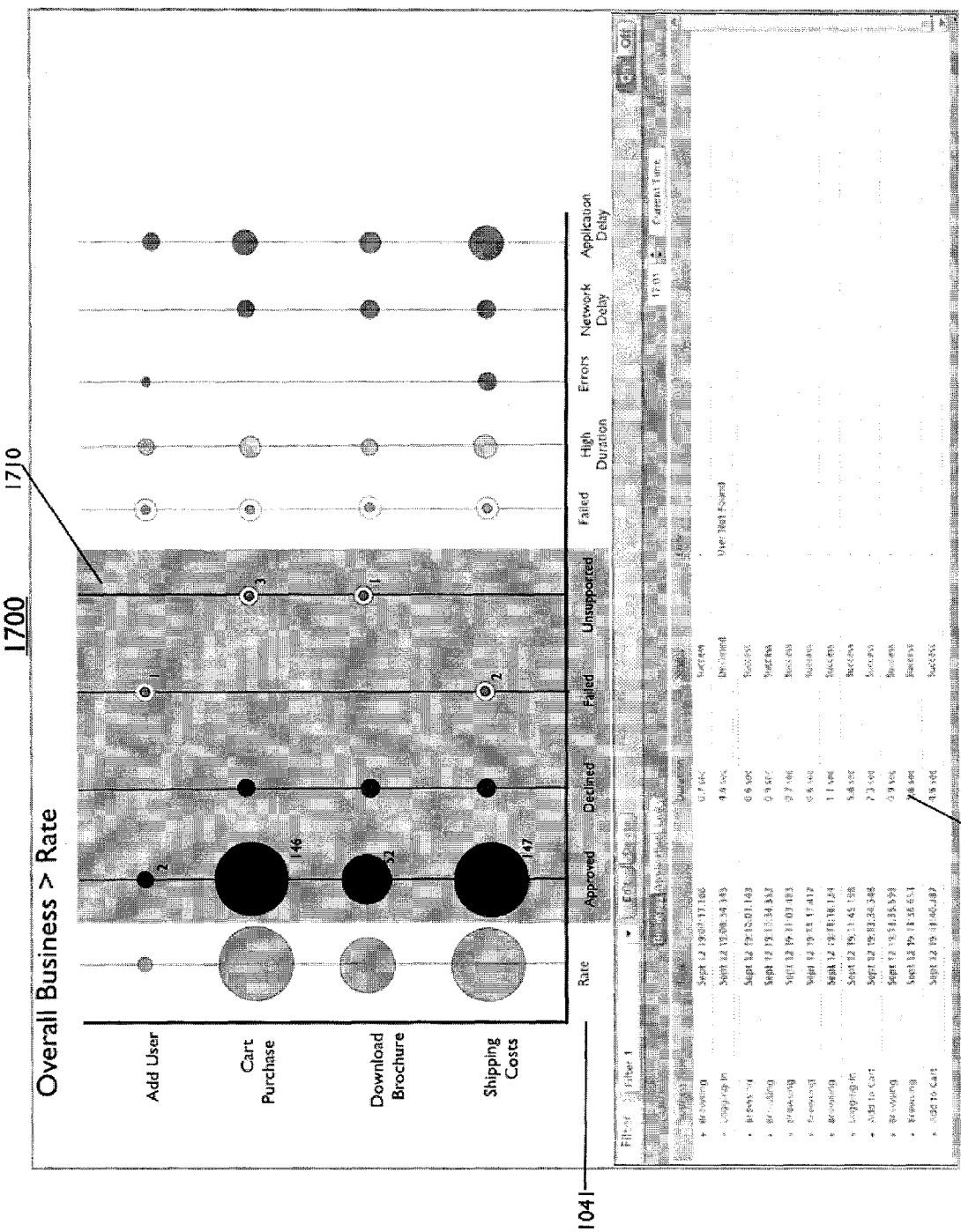
FIG. 17 is a screen capture illustrating a presentation in which a bubble grid is linked to an associated filtered transaction feed in accordance with an embodiment of the invention.

FIG. 17 is a screen capture illustrating a presentation 1700 in which a bubble grid 1710 is linked to an associated filtered transaction feed 1720 in accordance with an embodiment of the invention. With respect to links to associated transaction feeds, users can interact with a bubble or the axis to show the associated transaction feed or log (filtered if necessary) that have contributed to this statistic on the same screen. To accomplish this, the grid 1710 is displayed in a first portion of the screen and the transaction log 1720 is displayed in a second portion (e.g., below the first portion). The log 1720 is filtered to show the specific transaction type specified by the grid axis (e.g., "Rate" 1041) as shown in FIG. 17.

Figure 18:
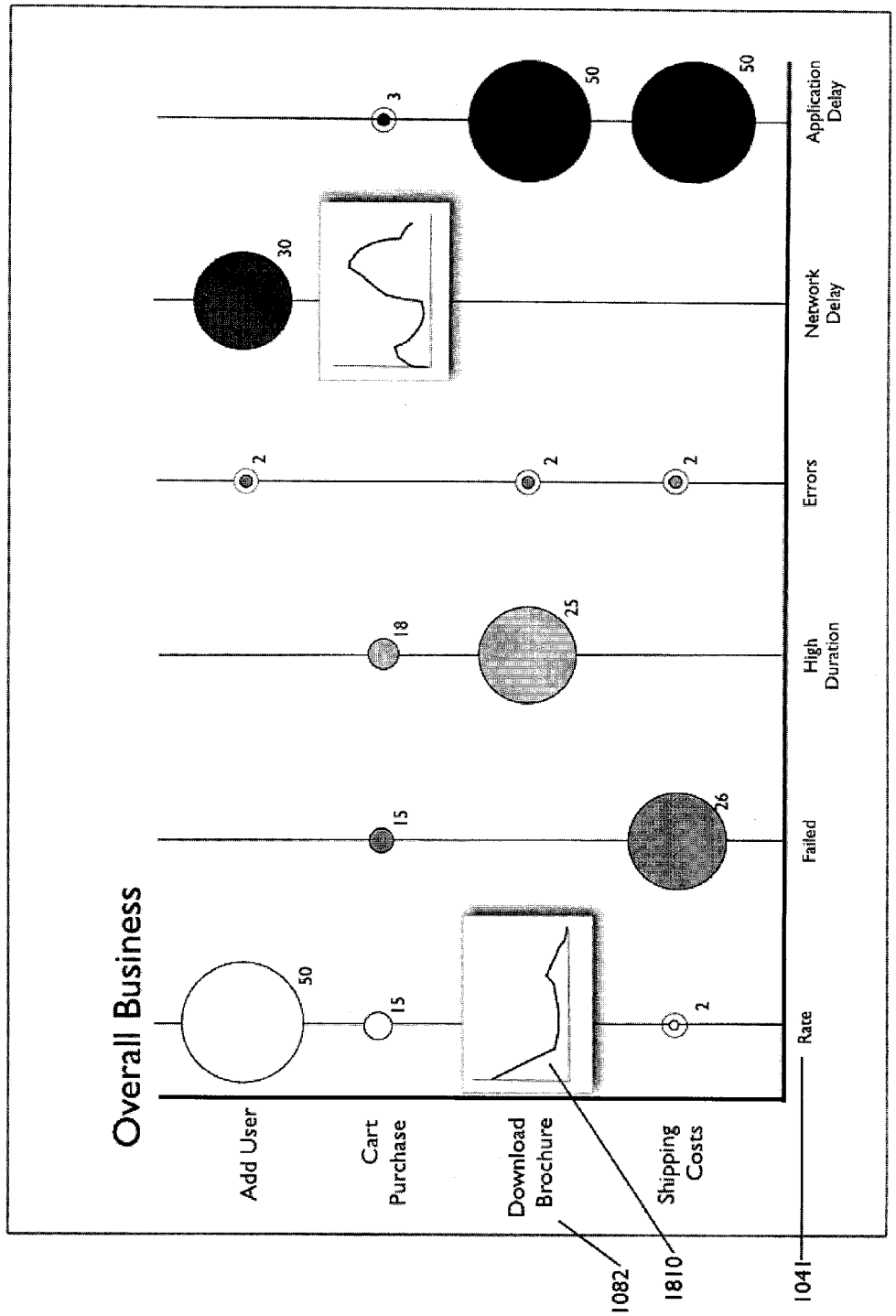
FIG. 18 is a screen capture illustrating a presentation in which trends for specific statistics are shown by turning bubbles into real time line graphs in accordance with an embodiment of the invention.

FIG. 18 is a screen capture illustrating a presentation 1800 in which trends for specific statistics 1041 are shown by turning bubbles 1882 into real-time line graphs 1810 in accordance with an embodiment of the invention. With respect to viewing statistic trends, users may click (e.g., right click or other interaction) on a bubble 1882 (as shown in FIG. 10) for a transaction 1082 to switch to a graph view 1810 of the statistic 1041, showing the trend of the statistic 1041 over time (e.g., a historical time view, etc.) as shown in FIG. 18. More accurate trends may be shown using this method and the value of a statistic 1041 may be shown as it changes over a longer period of time.

Figure 19:
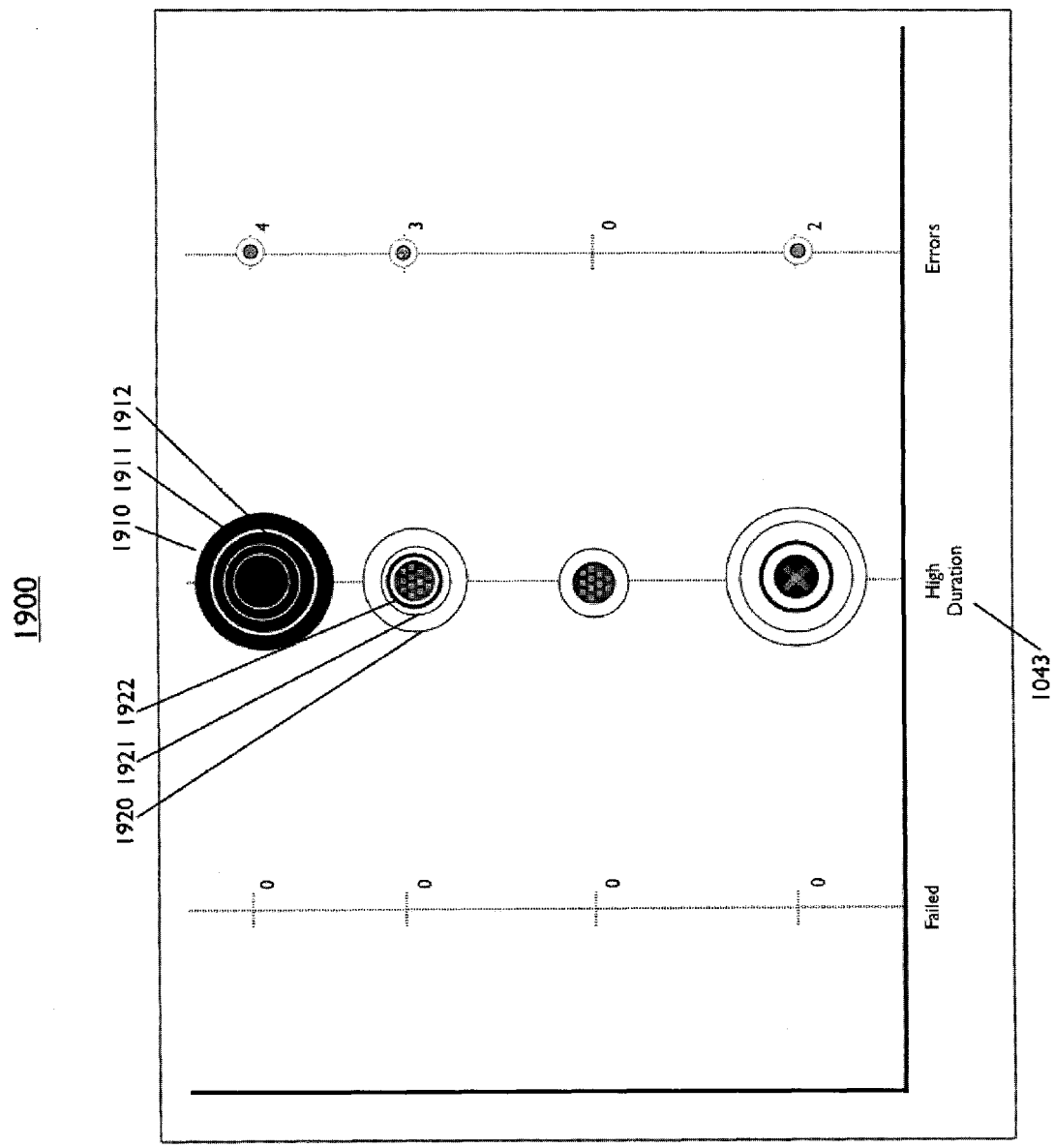
FIG. 19 is a screen capture illustrating a presentation in which bubbles have fading concentric rings to show trend of size changes over time in accordance with an embodiment of the invention.

FIG. 19 is a screen capture illustrating a presentation 1900 in which bubbles 1910 have fading concentric rings 1911, 1912 to show trend of size changes over time in accordance with an embodiment of the invention. Trending may also be shown by maintaining the last few circle or bubble values at different points in time and presenting these as rings 1911, 1912 for a bubble 1910. These rings 1911, 1912 may fade over time, with a ghosting effect, as shown in FIG. 19.

With respect to thresholds, colours of circles or bubbles may be used to highlight problems, for example, exceeding thresholds. A ring 1921 may be used to show a meaningful threshold for a bubble 1920. The value of the threshold 1922 (e.g., number, dots, rings, etc.) may also be presented.

With respect to performance, to handle high transaction rates, the system 300, 900 may samples statistics at a set rate (e.g., one per second) according to one embodiment. The system 300, 900 may transition the size of a bubble between values at a higher animation frame rate for smooth transitions between samples. Similarly, the associated real-time transaction logs may have a fixed frame rate.

According to one embodiment, the GUI 380 and presentations 1000-1900 may be configured and implemented as described in the following. In the following, an example of the data structures used to store the state of the GUI 380 and presentations 1000-1900, how the data is updated, and how the data is presented on the display 340 is provided. This is only an exemplary implementation. Other methods may also be used to generate the GUI 380 and presentations 1000-1900 described above.

With respect to data structures, the GUI 380 is configured and maintained with a data structure that describes the structure of the grid 1010 in terms of rows and columns (or "bands"), and the various attributes of each cell and sub-cell 1030.

The configuration of each cell 1030 contains information such as the statistical feeds required for presenting the bubble size, location and colour in the cell, filter settings for associated transactions (e.g., 1720), its current visual settings including colour, whether the current value (e.g., 1050) is shown on the bubble (e.g., 1020), whether a line graph (e.g., 1810) or bubble (e.g., 1882) is shown, and other information related to the data or presentation of the cell 1030.

An example data structure to describe the overall presentation is summarized in the following pseudo code:

```
struct BubbleVisual {
    int startRow = 0;
    int startColumn = 0;
    Band rows[ ];
    Band columns[ ];
    Cell cells[ ][ ];
}
```

The "rows" field contains the description of each row in a presentation (e.g., 1000), including rows that may not be expanded currently. The "columns" field contains the same for each column. The "cells" field contains the "Cell" data structure containing all attributes needed to retrieve statistical data and display it in the presentation. The number of cells must be the product of the number of rows and columns.

The "Band" data structure may be declared as follows:

```
struct Band {
    boolean isExpanded;
    int level;
    int position;
    char *name;
    BandDrawState state;
    int next;
}
```

The "isExpanded" field indicates whether this band is currently expanded to show the inner bands (rows or columns). The level value indicates the hierarchical level of the band on the axis, the position indicates its position at that level. These values can be used to calculate the cell size and location. The "name" is the name of the band for display on the appropriate row or column axis. The "state" structure is used to save the state of how the band was last drawn to enable transition effects when a band is expanded. The "next" field is the index to the next band in the row or column at the same level.

A "Cell" data structure contains all information required to display the statistic when it is shown in the presentation. For example:

```
struct Cell {
    boolean isDisplayed;
    boolean showValue;
    Statistic verticalStat;
    Statistic bubbleSizeStat;
    Statistic horizontalStat;
    CellDrawState state;
    // other fields and associated data as needed for bubble display
}
```

The associated row and column level and position are used to calculate the current cell size and location, this information may not be required in the "Cell" data structure. The "isDisplayed" flag is used by the implementation to easily know whether the values in the cell need to be updated for display. The "showValue" field may be used to indicate whether the current numeric values of statistics data should be shown (e.g., 1050) along with the bubble (e.g., 1020).

"Statistic" data structures (or objects) may be associated with the cell (e.g., 1030) to store the current statistic value in real-time or playback and any thresholds required to calculate normalized values required by the presentation. The statistic value may be updated periodically as the statistic changes. The GUI 380 may observe these changes, update normalized values in the cells, then draw the bubble 1020 (e.g., with the appropriate location, colour and size, and then draw the associated non-normalized text values nearby (e.g., 1050)). Note that the normalized values may be implemented as circular buffers that contain the last "N" values of the various statistics for that cell. These past values could be used to display concentric rings (e.g., 1911, 1912) around a bubble (e.g., 1910) or trail effects as the bubble moves in the cell.

The "state" structure contains the last drawing state of the "Cell" and contains information such as the x and y position on the screen, its width and height, current colour, transparency and other information. This may be used to transition between the old and new states of the "Cell" using animation when it is updated using, for example, a library. The use of the "BubbleVisual" data structures as described allows different rows and columns to have varying numbers of sub-rows and sub-columns to any depth.

Figure 20:
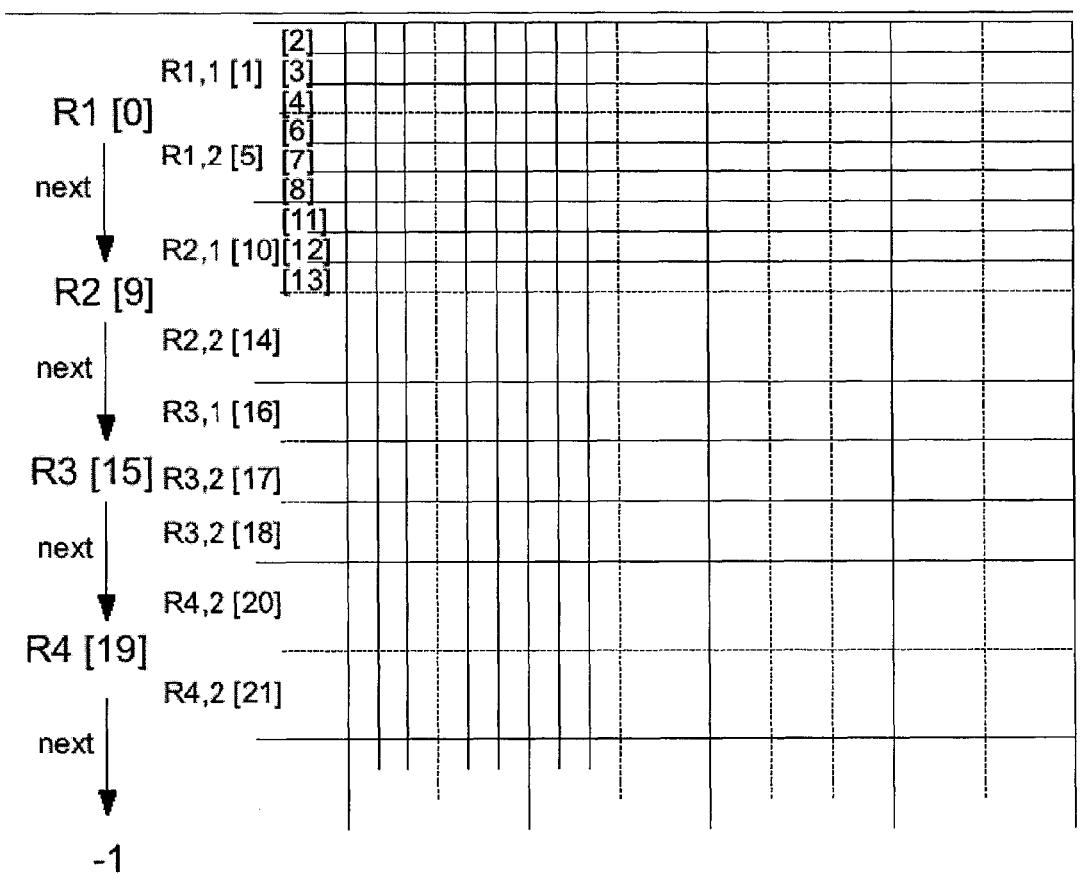
FIG. 20 is a schematic diagram illustrating cell organization for a presentation in accordance with an embodiment of the invention.

FIG. 20 is a schematic diagram illustrating cell organization for a presentation in accordance with an embodiment of the invention. In particular, FIG. 20 shows the cell organization for a presentation with four top level categories along the y axis (rows), multiple statistics along the x axis (columns), two second level categories in the first, second and fourth rows, three second level categories in the third row, and three third level categories in the first and second rows.

In this configuration, considering only the row bands, values [0], [9], [15] and [19] are the top level cell row indexes in the cell matrix for rows R1 to R4 in the presentation. The "Row" structure contains the next index for the current level, that is, rows[0].next=9, rows[9].next=15, and so on. The incremental index value contains the next row deeper in the hierarchy if it is not equal to the "Band.next" field as shown.

In R1, index values [1] and [5] are the indexes for the next level cells, that is, row[1].next=5. The index value −1 is used as a sentinel to indicate the end of the level, for example, row[19].next=−1 and row[4].next=−1.

To generate a presentation, the system 300, 900 iterates through each row and column that is visible in a nested loop starting with "startRow" and "startColumn". According to one embodiment, to determine whether a cell is visible, the cell is either a top level band, or the parent row and column band is marked "isExpanded=true". If a row or column is expanded, it pushes the next index for the current level on a stack, then starts iterating through the rows at the deeper level. The basic method is illustrated in the following pseudo code. The same iterative process can be used to update the statistical values in each cell.

```
updateDisplay(BubbleVisual visual)
    rowIndex = visual.startRows;
    colIndex = visual.startColumns;
    // draw axis by iterating through hierarchical rows, then columns
    drawRowAxis(visual, visual.startRows);
    drawColumnAxis(visual, visual.startColumns);
    // draw all cells in the hierarchical grid.
    drawGrid(visual, visual.startRows, visual.startColumns);
}
drawGrid(BubbleVisual visual, int rowIndex, colIndex) {
    Band cols[ ] = visual.cols;
    Band rows[ ] = visual.rows;
    Stack rowStack;
Stack colStack
while (rowIndex !=−1) {
    while (colIndex !=−1) {
        // draw the current cell based on its position, level
        drawCell(visual, rowIndex, colIndex);
        if (cols[colIndex].isExpanded) {
            colStack.push(visual.cols.[colIndex].next);
            colIndex ++;
        } else if (cols.[colIndex.next] == −1) {
            colIndex = colStack.pop( ) // this will be −1 at the top
level.
        } else {
            colIndex = cols[colIndex].next;
        }
    }
    // get the next row index to draw (same as columns)
    if (rows[rowIndex].isExpanded) {
        rowStack.push(rows.[rowIndex].next);
        rowIndex++;
    } else if (rows .[rowIndex .next] == −1) {
        rowIndex = rowStack.pop( )
    } else {
        rowIndex = rows[rowIndex].next;
    }
}
}
```

For each cell, the system 300, 900 displays the appropriate bubble or representation based on the statistic values and other attributes in the "Cell" data structure. Similarly, to update the presentation, the system 300, 900 periodically updates each "Cell" value that is visible with new statistics retrieved from the system. The above method may be is used to periodically update the presentation.

To expand a row (column or band), the system 300, 900 marks the row (column) by setting "isExpanded=true". It then iterates through the columns (rows) for each expanded row (column), updating their position, width and height based on the cell's level and position. Transition effects may then be applied to animate the movement of the rows and columns with their new position. Cell values are then updated from the source of data and the new cells are drawn.

To support breadcrumbs 1601, 1602, the data structure may be modified to start drawing cells at a certain level by setting the "startRow" and "startColumn" index when a user drills down. This will start the iteration through the grid at those index values. For example, if the "startRow" is set to 1, then only the cells (and sub-cells if expanded) in R1 will be drawn in the presentation. Note that the last index will not be −1 if a subset is drawn. In this case, the algorithm may require slight modification.

Aspects of the above described method may be summarized with the aid of a flowchart.

Figure 22:
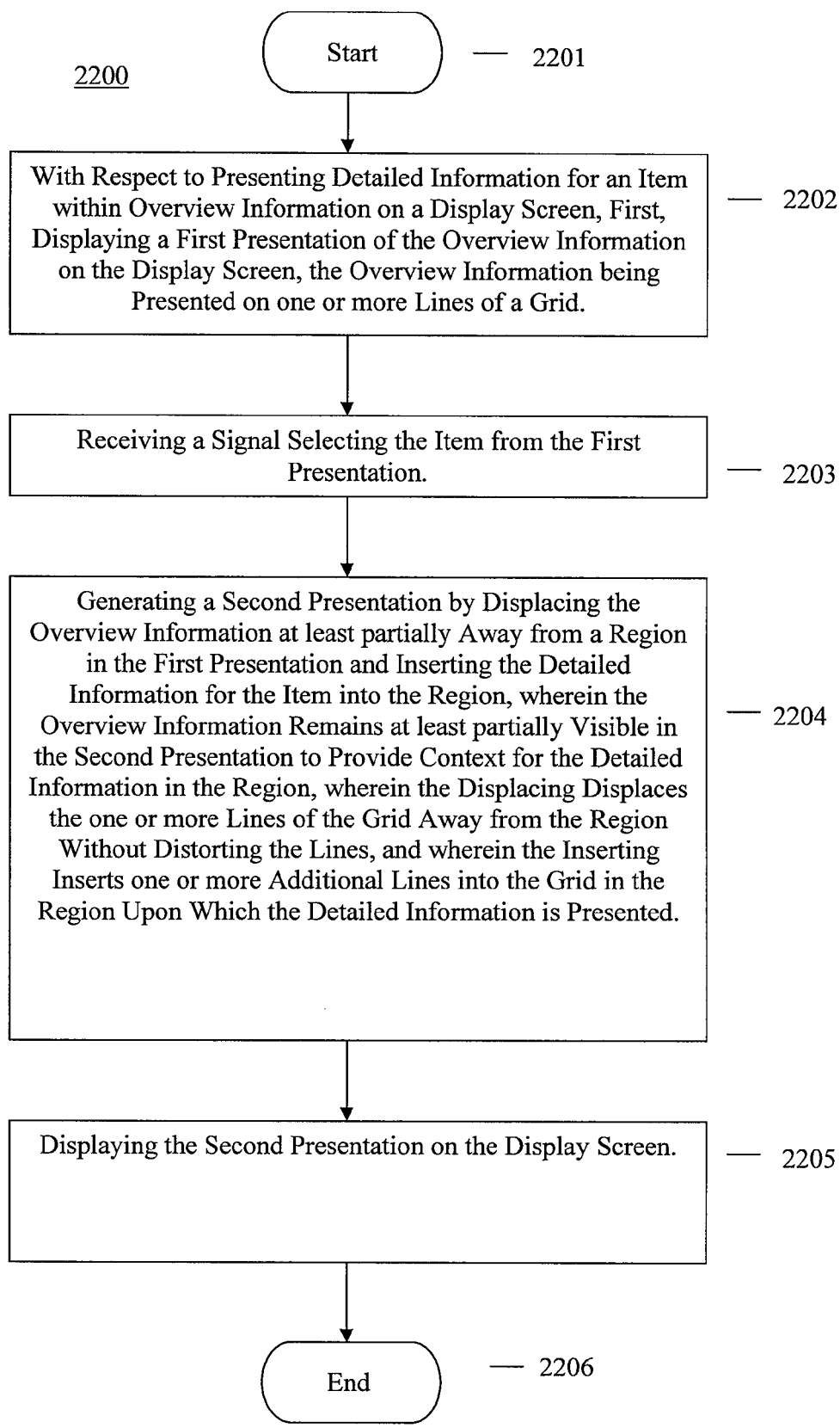

FIG. 22 is a flow chart illustrating operations 2200 of modules 321, 331 within a data processing system (e.g., 900, 300) for presenting detailed information 1112 for an item 1041 within overview information 1111 on a display screen 340, in accordance with an embodiment of the invention.

At step 2201, the operations 600 start.

At step 2202, a first presentation 1000 of the overview information 1111 is displayed on the display screen 340, the overview information 1111 being presented on one or more lines 1011 of a grid 1010.

At step 2203, a signal selecting the item 1041 from the first presentation 1000 is received.

At step 2204, a second presentation 1100 is generated by displacing the overview information 1111 at least partially away from a region 1110 in the first presentation 1000 and inserting the detailed information 1112 for the item 1041 into the region 1110, wherein the overview information 1111 remains at least partially visible in the second presentation 1100 to provide context for the detailed information 1112 in the region 1110, wherein the displacing displaces the one or more lines 1011 of the grid 1010 away from the region 1110 without distorting the lines 1011, and wherein the inserting inserts one or more additional lines 1011 into the grid 1010 in the region 1110 upon which the detailed information 1112 is presented.

At step 2205, the second presentation 1100 is displayed on the display screen 340.

At step 2206, the operations 2200 end.

In the above method, the overview information 1111 may be presented on the grid 1010 as one or more symbols 1020 corresponding to respective ones of one or more first 1080 and second 1040 categories of data. The grid 1010 may list the one or more first categories of data 1080 along a first axis 1060 and the one or more second categories of data 1040 along a second axis 1070. The one or more first categories of data 1080 may be one or more transactions 1080 and the one or more second categories of data 1040 may be one or more statistics 1040 relating to the one or more transactions 1080. The item 1041 may be one of the one or more transactions 1080 or one or more statistics 1040. The item 1041 may be a count 1050 for one of the one or more transactions 1080 or one or more statistics 1040. The region 1110 may be a region 1110 of the grid 1010 proximate to the item 1041. The displacing may include displacing one or more symbols 1020 away from the region 1110. The detailed information 1112 may be presented as one or more symbols 1120 corresponding to respective sub-categories 1141 of the one or more transactions 1080 or one or more statistics 1040. The inserting may include inserting the one or more symbols 1120 corresponding to respective sub-categories 1141 of the one or more transactions 1080 or one or more statistics 1040 into the region 1110. The one or more symbols 1020, 1120 may be one or more circles or one or more bubbles. The sizes, colours, or positions within the grid 1010 of the one or more symbols 1020, 1120 for a transaction 1083 or sub-categories of a transaction may correspond to values 1050, 1150 of the one or more statistics 1041, 1141 for the transaction 1083 or the sub-categories of the transaction. The values 1050, 1150 and hence the sizes, colours, or positions within the grid 1010 may be updated in real-time. The values 1050, 1150 and hence the sizes, colours, or positions within the grid 1010 may be updated by way of animation to smooth visual transitions. At least one 1882 of the one or more symbols for a transaction 1082 or sub-categories of a transaction may provide an indication 1810 of present and past values of the one or more statistics 1041 for the transaction 1082 or the sub-categories of the trans-action. The values and hence the indication 1810 may be updated in real-time. The overview information 1111 in the second presentation 1100 may be presented in a colour, shade, or transparency level different from that used in the first presentation 1000. The overview information 1111 in the second presentation 1100 may be presented at a reduced scale with respect to that used in the first presentation 1000. The detailed information 1112 may partially overlap the overview information 1111 in the second presentation 1100. The overview information 1111 and detailed information 1112 may be hierarchical time series data. And, the detailed information 1112 may be presented as one or more line graphs 1810.

According to one embodiment, each of the above steps 2201-2206 may be implemented by a respective software module 331. According to another embodiment, each of the above steps 2201-2206 may be implemented by a respective hardware module 321. According to another embodiment, each of the above steps 2201-2206 may be implemented by a combination of software 331 and hardware modules 321.

While this invention is primarily discussed as a method, a person of ordinary skill in the art will understand that the apparatus discussed above with reference to a data processing system 300 may be programmed to enable the practice of the method of the invention. Moreover, an article of manufacture for use with a data processing system 300, such as a pre-recorded storage device or other similar computer readable medium or computer program product including program instructions recorded thereon, may direct the data processing system 300 to facilitate the practice of the method of the invention. It is understood that such apparatus, products, and articles of manufacture also come within the scope of the invention.

In particular, the sequences of instructions which when executed cause the method described herein to be performed by the data processing system 300 can be contained in a data carrier product according to one embodiment of the invention. This data carrier product can be loaded into and run by the data processing system 300. In addition, the sequences of instructions which when executed cause the method described herein to be performed by the data processing system 300 can be contained in a computer software product or computer program product according to one embodiment of the invention. This computer software product or computer program product can be loaded into and run by the data processing system 300. Moreover, the sequences of instructions which when executed cause the method described herein to be performed by the data processing system 300 can be contained in an integrated circuit product (e.g., a hardware module or modules 321) which may include a coprocessor or memory according to one embodiment of the invention. This integrated circuit product can be installed in the data processing system 300.

The embodiments of the invention described above are intended to be exemplary only. Those skilled in the art will understand that various modifications of detail may be made to these embodiments, all of which come within the scope of the invention.

What is claimed is:

1. A method for presenting detailed information for an item within overview information on a display screen, comprising:

displaying a first presentation of the overview information on the display screen, the overview information being presented over one or more lines of a grid;

receiving a signal selecting the item from the first presentation;

generating a second presentation by displacing the overview information at least partially away from a region in the first presentation and inserting the detailed information for the item into the region, wherein the overview information remains at least partially visible in the second presentation to provide context for the detailed information in the region, wherein the displacing displaces the one or more lines of the grid away from the region without distorting the lines, and wherein the inserting inserts one or more additional lines into the grid in the region upon which the detailed information is presented over; and, displaying the second presentation on the display screen.

2. The method of claim 1 wherein the overview information is presented as one or more symbols corresponding to respective ones of one or more first and second categories of data.

3. The method of claim 2 wherein the grid lists the one or more first categories of data along a first axis and the one or more second categories of data along a second axis.

4. The method of claim 3 wherein the one or more first categories of data are one or more transactions and wherein the one or more second categories of data are one or more statistics relating to the one or more transactions.

5. The method of claim 4 wherein the item is one of the one or more transactions or one or more statistics.

6. The method of claim 5 wherein the item is a count for one of the one or more transactions or one or more statistics.

7. The method of claim 5 wherein the region is a region of the grid proximate to the item.

8. The method of claim 7 wherein the displacing includes displacing one or more symbols away from the region.

9. The method of claim 8 wherein the detailed information is presented as one or more symbols corresponding to respective sub-categories of the one or more transactions or one or more statistics.

10. The method of claim 9 wherein the inserting includes inserting the one or more symbols corresponding to respective sub-categories of the one or more transactions or one or more statistics into the region.

11. The method of claim 10 wherein the one or more symbols are one or more circles or one or more bubbles.

12. The method of claim 10 wherein sizes, colours, or positions within the grid of the one or more symbols for a transaction or sub-categories of a transaction correspond to values of the one or more statistics for the transaction or the sub-categories of the transaction.

13. The method of claim 12 wherein the values and hence the sizes, colours, or positions within the grid are updated in real-time.

14. The method of claim 12 wherein the values and hence the sizes, colours, or positions within the grid are updated by way of animation to smooth visual transitions.

15. The method of claim 10 wherein at least one of the one or more symbols for a transaction or sub-categories of a transaction provides an indication of present and past values of the one or more statistics for the transaction or the sub-categories of the transaction.

16. The method of claim 15 wherein the values and hence the indication are updated in real-time.

17. The method of claim 9 wherein the detailed information is presented as one or more line graphs.

18. The method of claim 1 wherein the overview information in the second presentation is presented in a colour, shade, or transparency level different from that used in the first presentation.

19. The method of claim 1 wherein the overview information in the second presentation is presented at a reduced scale with respect to that used in the first presentation.

20. The method of claim 1 wherein the detailed information partially overlaps the overview information in the second presentation.

21. The method of claim 1 wherein the overview information and detailed information is hierarchical time series data.

22. The method of claim 1 wherein the overview information and the detailed information is presented centered on the one or more lines and the one or more additional lines, respectively.

23. A system for presenting detailed information for an item within overview information on a display screen, comprising:
    a processor coupled to memory and the display screen; and,
    at least one of hardware and software modules within the memory and controlled or executed by the processor, the modules including:
    a module for displaying a first presentation of the overview information on the display screen, the overview information being presented over one or more lines of a grid;
    a module for receiving a signal selecting the item from the first presentation;
    a module for generating a second presentation by displacing the overview information at least partially away from a region in the first presentation and inserting the detailed information for the item into the region, wherein the overview information remains at least partially visible in the second presentation to provide context for the detailed information in the region, wherein the displacing displaces the one or more lines of the grid away from the region without distorting the lines, and wherein the inserting inserts one or more additional lines into the grid in the region upon which the detailed information is presented over; and,
    a module for displaying the second presentation on the display screen.

24. The system of claim 23 wherein the overview information and the detailed information is presented centered on the one or more lines and the one or more additional lines, respectively.

* * * * *